United States Patent [19]
Yoshimi et al.

[11] Patent Number: 5,795,660
[45] Date of Patent: Aug. 18, 1998

[54] ORGANIC COMPOSITE COATED STEEL SHEET HAVING A HIGH CORROSION RESISTANCE IN A RUST-CONTAMINATED ENVIRONMENT

[75] Inventors: Naoto Yoshimi; Takahiro Kubota; Takashi Ishiyama; Masaaki Yamashita, all of Tokyo; Yasuhiko Haruta, Kanagawa-ken, all of Japan

[73] Assignees: NKK Corporation, Tokyo; Kansai Paint Co., Ltd., Amagasaki, both of Japan

[21] Appl. No.: 773,380

[22] Filed: Dec. 26, 1996

Related U.S. Application Data

[63] Continuation of Ser. No. 428,149, filed as PCT/JP94/01214 Jul. 22, 1994, abandoned.

[30] Foreign Application Priority Data

| Sep. 4, 1993 | [JP] | Japan | 5-243737 |
| Sep. 4, 1993 | [JP] | Japan | 5-243738 |
| Apr. 28, 1994 | [JP] | Japan | 6-113590 |
| Apr. 28, 1994 | [JP] | Japan | 6-113591 |

[51] Int. Cl.$^6$ .......... B32B 15/04; B32B 15/18; B32B 27/06; B32B 27/38
[52] U.S. Cl. .......... 428/626; 428/622; 428/630; 428/632; 428/633; 428/659; 428/658; 428/666; 428/684
[58] Field of Search .......... 428/626, 630, 428/632, 658, 666, 684; 525/528

[56] References Cited

U.S. PATENT DOCUMENTS 4,889,775  12/1989  Adaniya et al. .......... 428/62 B

FOREIGN PATENT DOCUMENTS

| 2-15177 | 1/1990 | Japan | 428/626 |
| 2-274532 | 11/1990 | Japan | 428/626 |
| 4-180574 | 6/1992 | Japan | 428/626 |
| 4-48348 | 8/1992 | Japan | 428/626 |

OTHER PUBLICATIONS

The Iron and Steel Institute of Japan; "Current Advances in Materials and Processes", CAMP–ISIJ vol. 5, Publ. 1992; 3 pages.

Centre de Recherches Metallurgiques (CRM); "2nd International Conference on Zinc and Zinc Alloy Coated Steel Sheet/Galvatech '92" Publ. 1992. pp. 372–376 The Corrosion Resistance of Organic Composite–Coated Steel Sheets; 13 pages, Sep. 1992.

Encyclopedia of Polymer Science and Engineering, vol. 4, pp. 355–356, 1986.

*Primary Examiner*—David A. Simmons
*Assistant Examiner*—Linda L. Gray
*Attorney, Agent, or Firm*—Nields, Lemack & Dingman

[57] ABSTRACT

An organic composite coated steel sheet having an excellent corrosion resistance in a rust-contaminated environment. The sheet contains a chromate film on a zinc or zinc alloy plated sheet and an organic resin film on the chromate film. The resin film has a thickness of 0.2–2.0 microns. The resin film contains (a) a base resin obtained by adding at least one basic nitrogen atom and at least two primary hydroxyl groups to the ends of molecules of an epoxy resin, (b) a polyfunctional polyisocyanate compound having at least six isocyanate groups per molecule, and (c) a rust-preventing additive of a sparingly soluble chromate or a mixture of silica and a sparingly soluble chromate.

13 Claims, 7 Drawing Sheets

ORGANIC COMPOSITE COATED STEEL SHEET HAVING A HIGH CORROSION RESISTANCE IN A RUST-CONTAMINATED ENVIRONMENT

This application is a continuation of application Ser. No. 08/428,149, filed as PCT/JP94/01214 Jul. 22, 1994, now abandoned.

TECHNICAL FIELD

This invention relates to an organic composite coated steel sheet which can advantageously be used in making automobile bodies or electric appliances.

BACKGROUND ART

This corrosion of automobile bodies by the salts which are sprinkled on road surfaces to prevent their freezing during the wintertime has recently become a big social problem in North America, northern Europe, and other countries or regions having a cold winter. A high corrosion resistance has, therefore, come to be required of the steel sheets which are used for making automobile bodies, and there has been a growing tendency to use coated steel sheets having an improved corrosion resistance instead of conventional cold rolled steel strips.

In this connection, there are known organic composite coated steel sheets as disclosed in Japanese Patent Publication (KOKOKU) No. Hei 4-48348 and Japanese Patent Application laid open (KOKAI) under No. Hei 2-15177. These steel sheets comprise a steel sheet plated with zinc or a zinc alloy, and having a surface coated with a chromate film as a first layer, and an organic resin film as a second layer formed thereon. The organic resin film is composed of an organic resin comprising a base resin obtained by adding one or more basic nitrogen atoms and two or more primary hydroxyl groups to the ends of molecules of an epoxy resin, a polyisocyanate compound and a blocked isocyanate compound, and further contains specific proportions of silica and a sparingly soluble chromate. These sheets are excellent in corrosion resistance, weldability, anti-powdering property and paint adhesion. Japanese Patent Publication (KOKOKU) No. Hei 4-76392 discloses a paint composition for an organic resin film which is prepared by reacting an epoxy resin with a polyisocyanate compound to form a cured reaction product, and adding silica to it.

Attention has lately come to be drawn to corrosion resistance in a corrosive environment in which iron rust is present (hereinafter referred to as "rust-contaminated environment") [CAMP-ISIJ, vol. 5 (1992), p. 1693]. It has been pointed out that the exposure of an organic composite coated steel sheet to such an environment results in iron rust adhering to the surface of its organic resin film, and causing a great reduction of its excellent corrosion resistance to the extent that it is no longer appreciably superior in corrosion resistance to any ordinary zinc or zinc alloy plated steel sheet having no organic resin film thereon. It has lately been found that none of the conventional organic composite coated steel sheets as disclosed in the Japanese publications referred to above is always satisfactory in corrosion resistance in a rust-contaminated environment.

GALVATECH '92 (p. 372) states that there was obtained an organic composite coated steel sheet having a lower corrosion resistance in a rust-contaminated environment when the crosslinking density of its organic resin film was lowered by reducing the amount of a crosslinking agent added to an organic resin. It however, fails to describe any specific means for achieving an improved corrosion resistance in a rust-contaminated environment, though the above statement may suggest that an increase in the crosslinking density of an organic resin film may be effective for achieving an improved corrosion resistance.

Under there circumstances, it is an object of this invention to provide an organic composite coated steel sheet having an excellent corrosion resistance in a rust-contaminated environment.

DISCLOSURE OF THE INVENTION

We, the inventors of this invention, have found that there are two conditions which are very effective for improving the corrosion resistance of an organic composite coated steel sheet in a rust-contaminated environment:

(1) To form an organic resin film having a high crosslinking density by using a polyfunctional polyisocyanate compound as a curing agent; and (2) To use a sparingly soluble chromate, preferably both silica and a sparingly soluble chromate, as a rust-preventing additive.

According to this invention, therefore, there is provided an organic composite coated steel sheet as defined below:

(1) An organic composite coated steel sheet having an excellent corrosion resistance in a rust-contaminated environment which comprises a zinc or zinc alloy plated steel sheet having a surface coated with a chromate film having a coating weight of 10 to 200 mg/m$^2$ in terms of metallic chromium, and an organic resin film formed on the chromate film, having a thickness of 0.2 to 2.0 microns, and comprising:
  (i) a base resin obtained by adding at least one basic nitrogen atom and at least two primary hydroxyl groups to the ends of molecules of an epoxy resin;
  (ii) a polyfunctional polyisocyanate compound containing at least three isocyanate groups in each molecule; and
  (iii) a rust-preventing additive, the total amount of the base resin and the polyisocyanate compound and the amount of the rust preventing additive being in a ratio of from 90/10 to 40/60 by weight of nonvolatile matter.

(2) A coated steel sheet as set forth at (1) above, wherein the rust-preventing additive comprises a sparingly soluble chromate.

(3) A coated steel sheet as set forth at (1) above, wherein the rust-preventing additive comprises silica and a sparingly soluble chromate, and has a silica-chromate ratio of from 35/5 to 1/39 by weight of nonvolatile matter.

The following is a summary of preferred modes of carrying out this invention to form an organic resin film having still better properties:

(1) The polyfunctional polyisocyanate compound is employed in the amount of from 5 to 80 parts, more preferably from 10 to 50 parts, by weight for 100 parts by weight of the base resin as a solid;

(2) Hydrophobic silica is employed as the silica in the rust-preventing additive;

(3) The ratio of the total amount of the base resin and the polyisocyanate compound/the amount of the sparingly soluble chromate is from 70/30 to 40/60;

(4) The ratio of the total amount of the base resin and the polyisocyanate compound/the total amount of the sparingly soluble chromate and silica is from 70/30 to 40/60; and (5) Hydrophobic silica and a sparingly soluble chromate are employed in a ratio of from 20/20 to 1/39 as the rust-preventing additive.

A particularly high corrosion resistance in a rust-contaminated environment can be achieved by employing a polyfunctional polyisocyanate compound having at least four, and more preferably at least six, isocyanate groups in each molecule. An outstandingly high corrosion resistance can be achieved by employing, among others, polyfunctional hexamethylene diisocyanate.

The sparingly soluble chromate can be selected from among barium chromate, strontium chromate, calcium chromate, zinc chromate, potassium zinc chromate and lead chromate, and a mixture thereof.

DETAILED DESCRIPTION OF THE INVENTION

Figure 1:
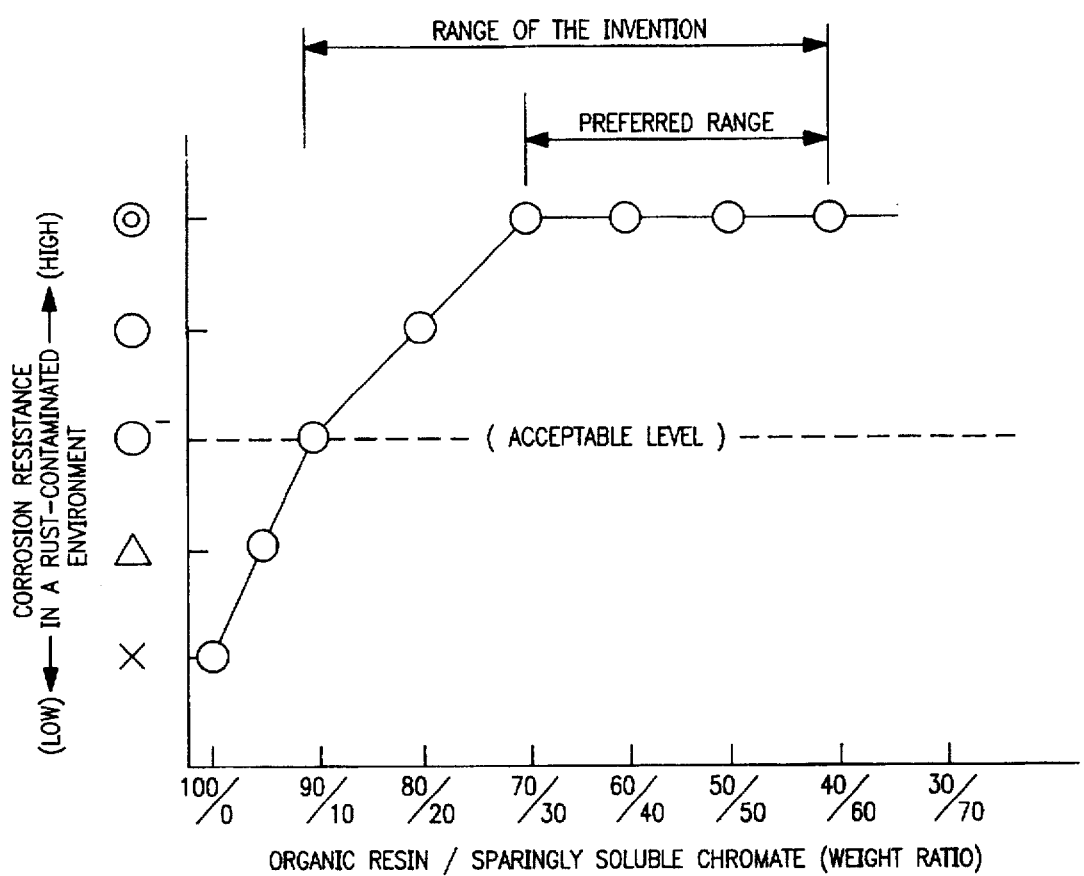
FIG. 1 is a graph showing the corrosion resistance of coated steel sheets as determined by seven cycles of corrosion tests in a rust-contaminated environment in relation to the ratio of an organic resin comprising a specific base resin and a polyfunctional polyisocyanate compound (a hexafunctional polyisocyanate compound of the isophorone diisocyanate series) to a sparingly soluble chromate.

Description will now be made of the details of this invention and the reasons for the limitations made for defining it.

The organic composite coated steel sheet of this invention has a chromate film formed on the surface of a zinc or zinc alloy plated steel sheet, and an organic resin film formed thereon from a specific composition. The organic resin film inhibits the excessive dissolution of hexavalent chromic acid ions from the chromate film into a corrosive environment and thereby allows the chromate film to produce a sustained effect of preventing corrosion. The organic resin film is of a resin composition obtained by reacting a base resin with a polyfunctional polyisocyanate compound as a curing agent, and having a high crosslinking density. The base resin is obtained by adding one or more basic nitrogen atoms and two or more primary hydroxyl groups to the ends of molecules of an epoxy resin, and the polyisocyanate compound has three or more isocyanate groups in each molecule. The organic resin film further contains a specific proportion of a rust-preventing additive which comprises a sparingly soluble chromate, or both silica and a sparingly soluble chromate. The resin composition and the rust-preventing additive work synergically to realize a corrosion resistance in a rust-contaminated environment which is outstandingly higher than what can be expected from any organic composite coated steel sheet known in the art.

The steel sheet which is used as base material may, for example, be a steel sheet plated with zinc or a Zn—Ni, Zn—Fe, Zn—Mn, Zn—Al, Zn—Cr, Zn—Co—Cr, Zn—Cr—Ni or Zn—Cr—Fe alloy, or plated with a composite layer which contains one or more additives, such as a metal oxide, sparingly soluble chromate, or polymer, in a layer of zinc or a zinc alloy. It may also be a steel sheet plated with a multi-layer consisting of two or more layers of the same or different compositions. The plating of the sheet can be effected by any method selected from among electrodeposition, hot dipping and vapor-phase deposition on a case to case basis, though electrodeposition may have an advantage over the other methods for plating a cold rolled steel strip.

The chromate film formed on the surface of the zinc or zinc alloy plated steel sheet inhibits the corrosion of the steel sheet by its self-healing effect owing to hexavalent chromic acid ions. If the chromate film has a coating weight of less than 10 mg/m$^2$ in terms of metallic chromium, it cannot be expected to impart any satisfactory corrosion resistance to the steel sheet, and if its coating weight exceeds 200 mg/m$^2$, it lowers the weldability of the steel sheet. Therefore, the chromate film is so formed as to have a coating weight of 10 to 200 mg/m$^2$ in terms of metallic chromium. Its coating weight is preferably from 20 to 100 mg/m$^2$ in terms of metallic chromium to realize still higher levels of corrosion resistance and weldability.

The chromate film may be of a reacted-in-place, electrolytic, or dried-in-place type chromate coating. The dried-in-place type chromate coating is, however, preferred from the standpoint of corrosion resistance, since it can form a chromate layer containing a large amount of hexavalent chromic acid ions.

The dried-in-place type chromate coating can be formed by coating the zinc or zinc alloy plated steel sheet with a solution consisting mainly of a partially reduced aqueous solution of chromic acid, and further containing one or more additives selected from among (1) to (7) below, if required, and drying it without rinsing it with water:

(1) An organic resin such as a water-soluble or-dispersible acrylic or polyester resin;

(2) a colloid and/or powder of oxide such as silica, alumina, titania or zirconia;

(3) an acid such as molybdic, tungstic or vanadic acid, and/or a salt thereof;

(4) a phosphoric acid such as phosphoric or polyphosphoric acid;

(5) a fluoride such as zirconium fluoride, silicofluoride or titanium fluoride;

(6) a metal ion such as a zinc ion; and (7) an electrically conductive fine powder such as iron phosphide or antimony-doped tin oxide.

A roll coater is usually employed for coating the strip with the solution, though it is also possible to apply the solution to the strip by dipping or spraying and regulate its coating weight with an air knife, or by roll squeezing.

Referring now to the epoxy resin used to form the organic resin coating, it is preferable to use mainly a product of condensation of epichlorohydrin with bisphenol A. Although there are also epoxy resins consisting solely of an aliphatic or alicyclic structure, such as epoxidized oil and epoxy polybutadiene, it is preferable to use an epoxy resin consisting mainly of the above product of condensation to achieve excellent corrosion resistance. The preferred epoxy resins which are commercially available include Epicoat 828, 1001, 1004, 1007, 1009 and 1010, which are the products of Shell Chemical Co., Ltd. It is possible to use one of these products, or a mixture of two or more products. It is desirable to use an epoxy resin having a number-average molecular weight of at least 1500, if it has to be cured at a low temperature.

It is possible to introduce basic nitrogen atoms and primary hydroxyl groups into an epoxy resin by, for example, adding alkanolamines and/or alkylalkanolamines to the oxirane groups of the epoxy resin. The amines which can be employed include monoethanolamine, diethanolamine, dimethylamino-ethanol, monopropanolamine, dipropanolamine and dibutanolamine. One of these amines, or a mixture thereof may be employed.

Explanation will now be made of the advantages which can be expected from the use of the base resin as described above. The epoxy resin obtained by the condensation of epichlorohydrin with bisphenol A can form an organic resin coating permitting the excellent adhesion of a cationic electrodeposition paint which is usually employed for preventing the rusting of automobile bodies. The following is a summary of the advantages which can be expected from the introduction of basic nitrogen atoms and primary hydroxyl groups into the epoxy resin:

(1) It is possible to prevent the destruction of the organic resin coating by the action of an alkali occurring from cationic electrodeposition and stabilize its adhesion to the underlying chromate coating and a coating formed by cationic electrodeposition;

(2) The primary hydroxyl groups and an appropriately selected organic solvent, which will hereinafter be described, improve the reactivity of the epoxy resin with a crosslinking agent at a low temperature; and (3) The introduction of at least two mols of hydroxyl groups per molecule of the epoxy resin enables the formation of a film having a satisfactorily high crosslinking density. No satisfactory crosslinking can be expected from the introduction of less than two mols of hydroxyl groups.

It is also effective to modify the epoxy resin partially with another compound, though it is necessary to introduce an average of at least to moles of primary hydroxyl groups per molecule of the epoxy resin.

The partial modification of the epoxy resin can be effected by, for example:

(1) Esterification by a monocarboxylic acid (e.g., a saturated or unsaturated fatty acid, such as coconut, soybean or castor oil fatty acid; a low-molecular aliphatic monocarboxylic acid, such as acetic, propionic or butyric acid; or an aromatic monocarboxylic acid, such as benzoic acid);

(2) Modification with an aliphatic or aromatic amine (e.g., an aliphatic amine such as monomethylamine, dimethylamine, monoethylamine, diethylamine or isopropylamine; or an aromatic amine such as aniline); or (3) Modification with an oxo acid (e.g., lactic or γ-hydroxypropionic acid).

It is inappropriate for the purpose of this invention to employ an epoxy resin modified with a dicarboxylic acid (e.g., adipic or sebacic acid), since it has too high a molecular weight. Moreover, the reaction is difficult to control to maintain a uniform molecular weight distribution. Furthermore, no improved corrosion resistance can be expected from a layer of any such modified epoxy resin.

The organic resin coating is preferably cured by utilizing a urethanation reaction between the hydroxyl groups in the base resin and the isocyanate groups in the poly-isocyanate compound.

Referring now to the polyisocyanate compound employed in the organic resin coating, it is necessary to use a compound having at least three isocyanate groups in each molecule to ensure an improved corrosion resistance in a rust-contaminated environment. The isocyanate groups may or may not be blocked. No satisfactorily improved corrosion resistance can be expected from the use of any monoisocyanate compound having one isocyanate group per molecule, or any diisocyanate compound having two isocyanate groups per molecule. We have found that the use of a polyfunctional isocyanate compound having at least three, or preferably at least four, or more preferably at least six, isocyanate groups per molecule makes it possible to obtain a higher corrosion resistance in a rust-contaminated environment than what can be obtained when any monoisocyanate or diisocyanate compound is employed.

Examples of the polyfunctional polyisocyanate compounds having at least three isocyanate groups per molecule are a compound having at least three isocyanate groups per molecule, a compound obtained by reacting an isocyanate compound having at least two isocyanate groups with a poly-hydric alcohol, and a burette or isocyanuric ring type adduct thereof. More specific examples are a polyisocyanate compound having at least three isocyanate groups, such as triphenylmethane-4,4', 4"-triisocyanate, 1,3,5-triisocyanatobenzene, 2,4,6-triisocyanatotoluene, 4,4'-dimethyldiphenylmethane-2,2', 5,5'-tetraisocyanate; an adduct obtained by reacting a polyisocyanate compound in an amount giving an excess of isocyanate groups with the hydroxyl groups of a polyol, such as ethylene glycol, propylene glycol, 1,4-butylene glycol, polyalkylene glycol, trimethylolpropane or hexanetriol; and a burette or isocyanuric ring type adduct thereof, such as hexamethylene diisocyanate, isophorone diisocyanate, tolylene diisocyanate, xylylene diisocyanate, 4,4'-diphenylmethane diisocyanate or 4,4'-methylenebis(cyclohexyl isocyanate).

Examples of the polyisocyanate compounds which can be reacted with polyols to form adducts are a polyisocyanate compound having at least three isocyanate groups; an aliphatic diisocyanate compound such as hexamethylene diisocyanate, 1,4-tetramethylene diisocyanate, dimer acid diisocyanate or lysine diisocyanate; and alicyclic diisocyanate compound, such as isophorone diisocyanate, 4,4'-methylenebis(cyclohexyl isocyanate), methylcyclohexane- 2,4-(or -2,6-)diisocyanate or 1,3-(or 1,4-)di (isocyanatomethyl)cyclohexane; and an aromatic diisocyanate compound such as xylylene diisocyanate, tolylene diisocyanate, m-(or p-)phenylene diisocyanate, diphenylmethane diisocyanate or bis(4-isocyanatophenyl)-sulfone.

Polyfunctional hexamethylene diisocyanate is, among others, preferred for achieving a high corrosion resistance in a rust-contaminated environment, though there are also many other effective polyfunctional polyisocyanate compounds having six isocyanate groups per molecule (hexafunctional polyisocyanate compounds).

It is possible to use two or more polyfunctional polyisocyanate compounds together, or a mixture of homologous compounds having different numbers of isocyanate groups per molecule.

It is necessary to protect the isocyanate groups in the curing agent to form a stable coating. The isocyanate group may be protected by a protective group (or a blocking agent) which is dissociated upon heating for curing, so that the isocyanate group may be regenerated.

Examples of the protective (or blocking) agents which can be employed are:

(1) Aliphatic monoalcohols, such as methanol, ethanol, propanol, butanol and octyl alcohol;
(2) Monoethers, such as monomethyl, monoethyl, monopropyl (n- or iso), monobutyl (n-, iso or sec) ethers, of ethylene glycol and/or diethylene glycol;
(3) Aromatic alcohols, such as phenol and cresol, and
(4) Oximes, such as acetoxime and methyl ethyl ketone oxime.

If one or more of these agents are reacted with the isocyanate compound, there is obtained an isocyanate compound which is so protected as to be stable at least at ordinary room temperature.

The polyfunctional polyisocyanate compound is preferably employed in the amount of 5 to 80 parts, or more preferably 10 to 50 parts, by weight as the curing agent for 100 parts by weight of the base resin (solid). If the amount of the curing agent is less than 10 parts by weight, there is formed only a coating having a crosslinking density which is too low for achieving any satisfactorily improved corrosion resistance in a rust-contaminated environment. If it exceeds 80 parts by weight, there is obtained only a coating which is low not only in corrosion resistance in a rust-contaminated environment, but also in perforation corrosion resistance and adhesion, since the unreacted isocyanate absorbs water.

It is possible to use as a crosslinking agent with the isocyanate compound an alkyl-etherified amino resin obtained by reacting with a monohydric alcohol having 1 to 5 carbon atoms a part or all of a methylol compound obtained by reacting at least one of melamine, urea and benzoguanamine with formaldehyde.

Although the crosslinking agent as described above can satisfactorily crosslink the resin, it is desirable to use also a known curing catalyst to increase the crosslinkability of the resin at a low temperature. It is possible to use, for example, N-ethylmorpholine, dibutyltin dilaurate, cobalt naphthenate, stannous chloride, zinc naphthenate or bismuth nitrate as the catalyst. The resin composition may further contain, for example, a known acrylic, alkyd or polyester resin to form a coating which is improved in adhesion and some other physical properties.

The organic resin coating as described above is intended for achieving a high level of perforation corrosion resistance, a close adhesion to a multilayer film of paint formed by two or more coats thereof, and a high level of corrosion resistance in a corrosive environment including iron rust. The following is a more specific description of these features:

(1) The epoxy resin of which the resin composition consists mainly enables the coating to adhere closely to the steel surface and a film of paint formed by cationic electrodeposition and exhibit a high level of perforation corrosion resistance;
(2) The basic polarity of the resin prevents any deterioration of its structure by an alkali appearing on the interface during cationic electrodeposition; and
(3) The composition can form a film having a high crosslinking density and thereby a high corrosion resistance in a rust-contaminated environment, since the polyfunctional polyisocyanate compound having at least three isocyanate groups per molecule is used as the curing agent for the epoxy resin containing at least two hydroxyl groups per molecule.

The composition can be used in the form of a water-dispersible or -soluble composition obtained by neutralizing the base in the epoxy resin with a low-molecular acid. It is, however, advisable to use a composition dissolved in an organic solvent without such neutralization for coating a steel sheet which requires drying at a low steel temperature not exceeding 250° C., and particularly, a BH steel sheet which requires drying at a still lower temperature not exceeding 170° C.

A water-dispersible or -soluble composition is likely to form a film which is somewhat low in corrosion resistance and adhesion, since the acidic compound which is required for making the composition water-soluble is likely to form a salt which absorbs water in and under the film in a moist environment, while also disabling the formation of any satisfactorily strong film by drying at a low temperature.

Although it is possible to use one or a mixture of organic solvents which are usually employed in the paint industry, it is advisable to avoid the use of any high-boiling alcoholic solvent, since it inhibits the curing reaction of the film. Examples of the solvents which should not be used are ethylene glycol, diethylene glycol, monoalkyl ethers, and alcohols having five or more carbon atoms and primary hydroxyl groups. The solvents which are recommended include hydrocarbons, ketones, esters and ethers. It is also appropriate to use alcohols having not more than four carbon atoms and a low molecular weight, or having secondary or tertiary hydroxyl groups.

The organic resin film or coating may contain a specific proportion of a sparingly soluble chromate as the rust-preventing additive. It cooperates with the resin composition to achieve a high level of corrosion resistance in a rust-contaminated environment.

The sparingly soluble chromate is considered to inhibit the corrosion of the zinc or zinc alloy plated steel sheet by discharging hexavalent chromic acid ions as a result of its slight dissolution in a corrosive environment, as is the case with the chromate in the underlying layer.

The sparingly soluble chromate which can be employed for the purpose of this invention is a fine powder of, for example, barium chromate ($BaCrO_4$), strontium chromate ($SrCrO_4$), calcium chromate ($CaCrO_4$), zinc chromate ($ZnCrO_4 \cdot 4Zn(OH)_2$), potassium zinc chromate ($K_2O \cdot 4ZnO \cdot 4CrO_3 \cdot 3H_2O$), or lead chromate ($PbCrO_4$). It is also possible to use a mixture of two or more such salts. It is, however, preferable from the standpoint of corrosion resistance to use barium or strontium chromate, or both, since they can be expected to exhibit the self-healing effect of chromic acid ions over a long period of time. The use of barium chromate, which is poorly soluble in water, is preferred to minimize the dissociation of water-soluble chromium from the organic resin coating during the treatment of automobile bodies prior to paint application.

The sparingly soluble chromate is considered to rely upon hexavalent chromic acid ions for healing any defect formed in the organic resin coating by rust in a rust-contaminated environment.

According to this invention, a high level of corrosion resistance in a rust-contaminated environment can be achieved by the combined effects of the resin composition and the sparingly soluble chromate when the latter is employed in a specific ratio by weight of nonvolatile matter to the former: i.e., (Base resin + polyfunctional polyisocyanate compound/sparingly soluble chromate=90/10 to 40/60.

If the ratio exceeds 90/10, the resin composition and the sparingly soluble chromate do not produce any satisfactorily high combined effect, but form a film having only a low level of corrosion resistance in a rust-contaminated environment. If the ratio is lower than 40/60, the amount of the epoxy resin is too small to provide an effective binder for any closely adhering layer of paint.

Figure 2:
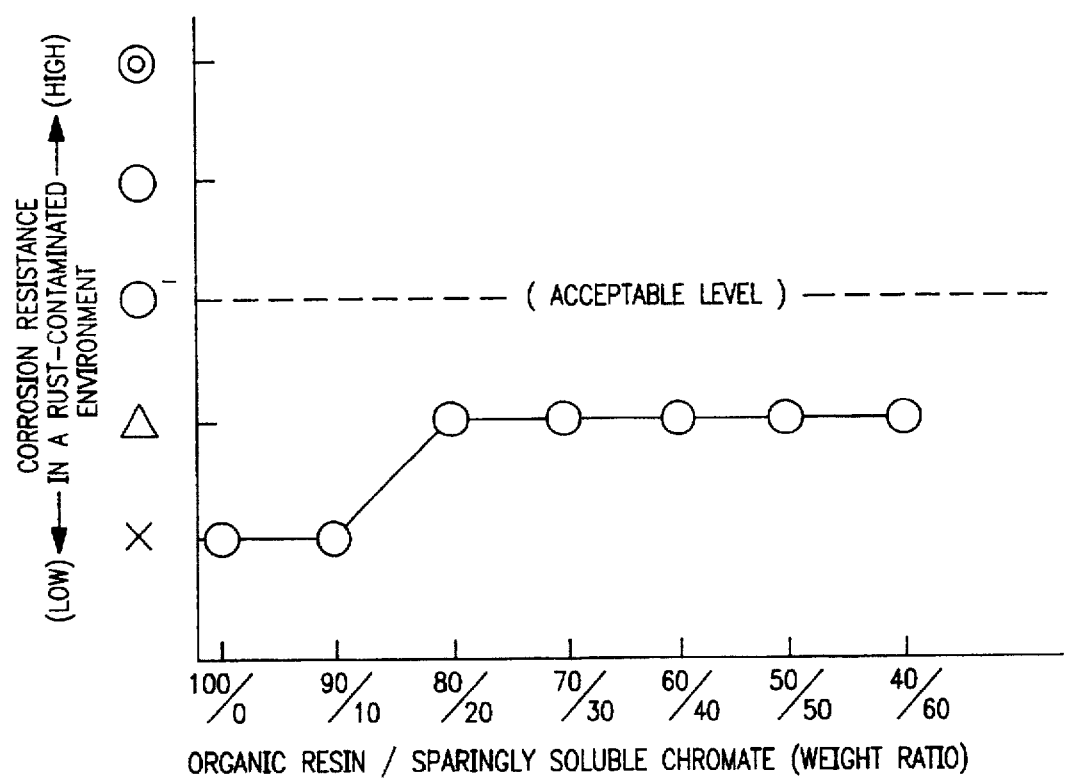
FIG. 2 is a graph showing the corrosion resistance of coated steel sheets as determined by even cycles of corrosion tests in a rust-contaminated environment in relation to the ratio of an organic resin containing a conventional diisocyanate compound as a curing agent to a sparingly soluble chromate.

FIG. 1 shows the corrosion resistance of coated steel sheets as determined by seven cycles of corrosion tests in a rust-contaminated environment in relation to the ratio by weight of an organic resin (No. 2 in Table 2), which comprises a specific base resin and a hexafunctional polyisocyanate compound of the isophorone diisocyanate series, to a sparingly soluble chromate. As is obvious therefrom, the ratio of the organic resin/sparingly soluble chromate in excess of 90/10 resulted in an undesirably low level of corrosion resistance in a rust-contaminated environment, while the ratio falling short of 40/60 resulted in an undesirably low paint adhesion. It is, thus, obvious that the ratio of the organic resin/sparingly soluble chromate is preferably from 90/10 to 40/60, and more preferably, from 70/30 to 40/60. For the sake of comparison, FIG. 2 shows the corrosion resistance of coated steel sheets as determined by seven cycles of corrosion tests in a rust-contaminated environment in relation to the ratio by weight of an organic resin containing a conventional diisocyanate compound (HMDI) as the curing agent to a sparingly soluble chromate. It is obvious from the results shown in FIGS. 1 and 2 that the excellent corrosion resistance of the products of this invention owes itself to the combined effects of the polyfunctional polyisocyanate compound and the sparingly soluble chromate employed in the specific proportions.

Figure 4:
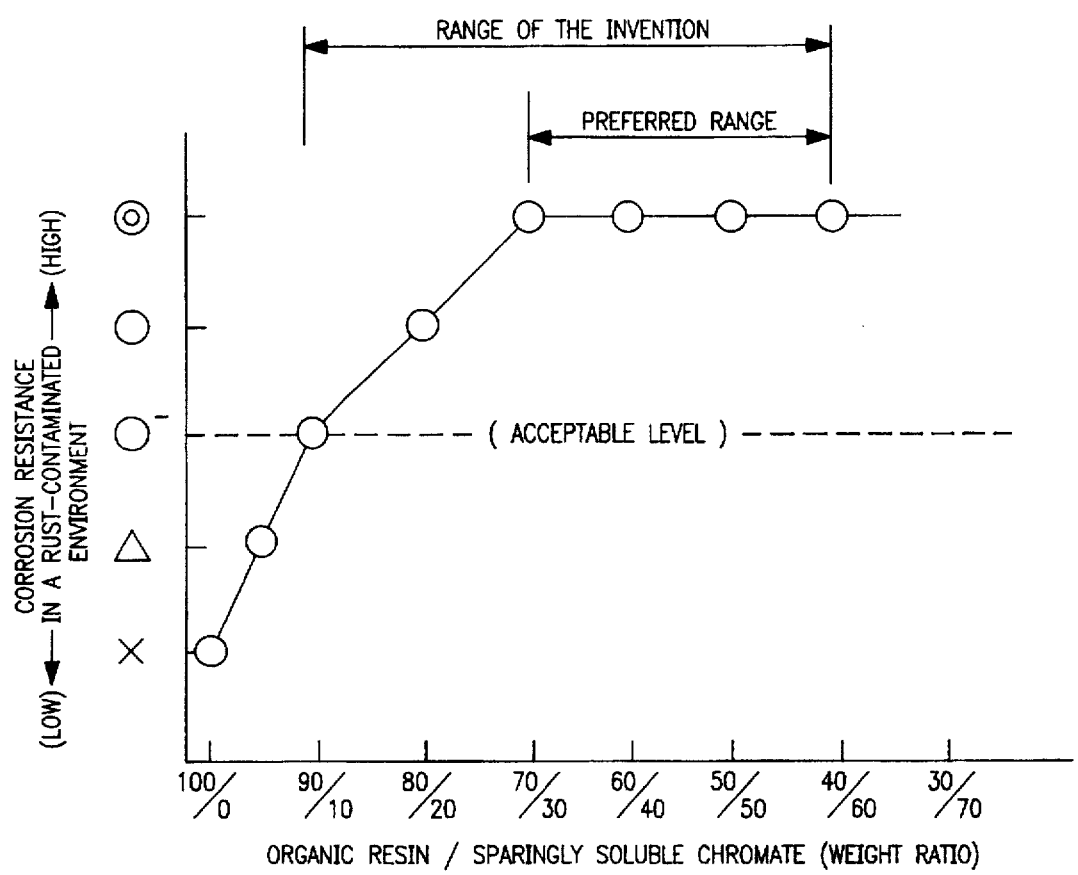
FIG. 4 is a graph showing the corrosion resistance of coated steel sheets as determined by 15 cycles of corrosion tests in a rust-contaminated environment in relation to the ratio of an organic resin comprising a specific base rein and a hexafunctional polyisocyanate compound of the hexamethylene diisocyanate series to a sparingly soluble chromate.

FIG. 4 shows the corrosion resistance of coated steel sheets as determined by 15 cycles of corrosion tests in a rust-contaminated environment in relation to the ratio by weight of an organic resin containing a hexafunctional polyisocyanate compound of the hexamethylene diisocyanate series as the curing agent to a sparingly soluble chromate. The ratio of the organic resin/sparingly soluble chromate in excess of 90/10 resulted in an undesirably low level of corrosion resistance, while the ratio falling short of 40/60 resulted in an undesirably low paint adhesion. Thus, it is obvious that the ratio is preferably from 90/10 to 40/60, and more preferably from 70/30 to 40/60, as is the case with the organic resin coating containing an isophorone diisocyanate type compound as the curing agent.

The hexafunctional polyisocyanate compound of the hexamethylene diisocyanate series, however, makes it possible to achieve a higher level of corrosion resistance in a rust-contaminated environment than what can be obtained when the isophorone diisocyanate type compound is employed, if the ratio of the organic resin/sparingly soluble chromate is the same, as is obvious from the description of Examples which will hereinafter appear (compare, for example, Nos. 51 and 55 in Example 1).

The organic resin coating may contain specific proportions of both silica and a sparingly soluble chromate as the rust-preventing additive to realize high levels of corrosion resistance in a rust-contaminated environment and perforation corrosion resistance.

Silica promotes the formation of basic zinc chloride, which is an effective corrosion inhibitor, as one of the corrosion products of a zinc or zinc alloy plated steel sheet. Moreover, silica apparently can prevent corrosion effectively by dissolving slightly in a corrosive environment and forming a silicic acid ion which serves as a film-forming corrosion inhibitor.

The silica which can be employed for the purpose of this invention is, for example, fumed silica (e.g. products of Nippon Aerozile Co., Ltd. known as AEROSIL 130, AEROSIL 200, AEROSIL 300, AEROSIL 380, AEROSIL R972, AEROSIL R811 and AEROSIL R805), organosilica sol (e.g. products of Nissan Chemical Industries, Ltd. known as MA-ST, IP$^4$-ST, NBA-ST, IBA-ST, EG-ST, XBA-ST, ETC-ST and DMAC-ST), silica of the precipitated type obtained by the reaction of sodium silicate and mineral acids (e.g. products of Tokuyama Soda Co., Ltd. known as T-32(S), K-41 and F-80), or silica of the gel type obtained by the reaction of sodium silicate and mineral acids (e.g. products of Fuji Davison Chemical Ltd. known as SYLOID 244, SYLOID 150, SYLOID 72, SYLOID 65 and SHIELDEX). It is also possible to use a mixture of two or more types of silica.

There are hydrophilic and hydrophobic forms of silica. Although hydrophilic silica may effectively be used for achieving an improved corrosion resistance in a rust-contaminated environment, hydrophobic silica is more effective for that purpose.

Hydrophilic silica has a hydrophilic surface covered with a hydroxyl group (silanol

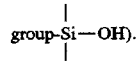

The silanol group is so high in reactivity as to react easily with an organic compound and give an organic surface to silica.

Hydrophobic silica has a hydrophobic surface formed by substituting e.g. a methyl or alkyl group for a part or substantially all of the silanol group on the surface of hydrophilic silica.

While there are a variety of methods available for preparing hydrophobic silica, it can typically be prepared by the reaction of alcohols, ketones, esters or other organic solvents and silanes, silazanes, polysiloxanes, etc. which may be effected under pressure in an organic solvent, or under heat in the presence of a catalyst.

Although silica as a whole is effective for preventing corrosion, hydrophobic silica is particularly effective for achieving an improved corrosion resistance in a rust-contaminated environment. Hydrophilic silica is less effective for that purpose apparently because of its high hydrophilic property which is very likely to cause the penetration of iron ions, or oxides from iron rust. The use of hydrophobic silica is, therefore, preferred for the purpose of this invention.

According to this invention, it is possible to realize high levels of corrosion resistance in a rust-contaminated environment and perforation corrosion resistance by adding specific proportions of silica and a sparingly soluble chromate to the resin composition which comprises a specific base resin and a polyfunctional polyisocyanate compound as described above. More specifically, it is possible to achieve a high level of corrosion resistance (corrosion resistance in a rust-contaminated environment and perforation corrosion resistance) by employing silica and a sparingly soluble chromate in the ratios by weight of nonvolatile matter as set forth below:

(Base resin + polyfunctional polyisocyanate compound)/(silica + sparingly soluble chromate) = 90/10 to 40/60; and    (1)

Silica/sparingly soluble chromate = 35/5 to 1/39.    (2)

If the ratio of (base resin + polyfunctional polyisocyanate compound)/(silica + sparingly soluble chromate) exceeds 90/10, the resin composition and the silica and sparingly soluble chromate do not produce any satisfactorily good effect of preventing corrosion, but form a coating having only a low level of corrosion resistance in a rust-contaminated environment. If it falls short of 40/60, the amount of the epoxy resin is too small to be an effective binder for any closely adhering film of paint. If the ratio of silica/sparingly soluble chromate exceeds 35/5, there is formed only a coating having a low level of corrosion resistance in a rust-contaminated environment, and if it falls short of 1/39, there is formed only a coating having a low level of perforation corrosion resistance.

Silica promotes the formation of stable corrosion products and thereby restrains corrosion by rust in a rust-contaminated environment, while the sparingly soluble chromate heals by hexavalent chromic acid ions any defect formed in the organic resin coating by rust in such an environment. The combination of silica and sparingly soluble chromate having different mechanisms for restraining corrosion by rust as described above makes it possible to achieve a high level of corrosion resistance in a rust-contaminated environment. The combination also makes it possible to obtain a high level of perforation corrosion resistance.

Figure 5:
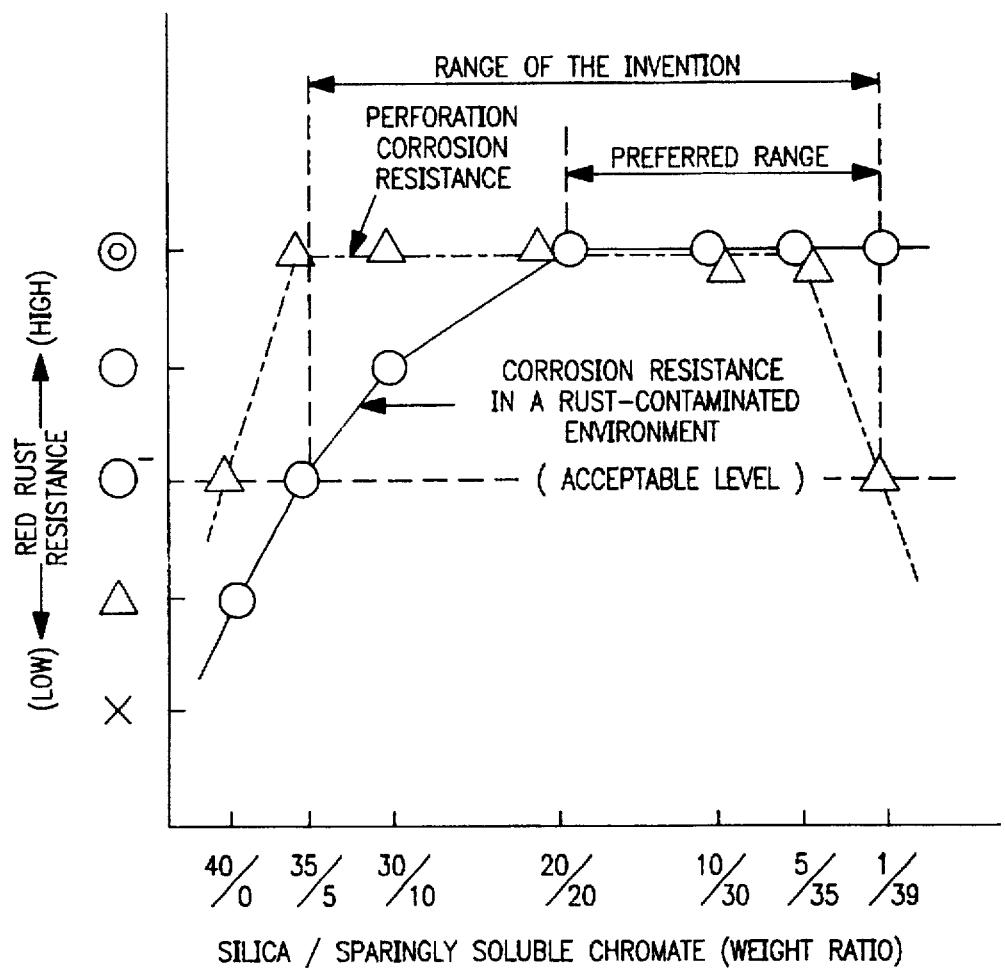
FIG. 5 is a graph showing the perforation corrosion resistance of coated steel sheets and their corrosion resistance as determined by seven cycles of corrosion tests in a rust-contaminated environment in relation to the ratio by weight of silica and a sparingly soluble chromate which were added to an organic resin comprising a specific base resin and a polyfunctional polyisocyanate compound (a hexafunctional polyisocyanate compound of the isophorone diisocyanate series)
Figure 6:
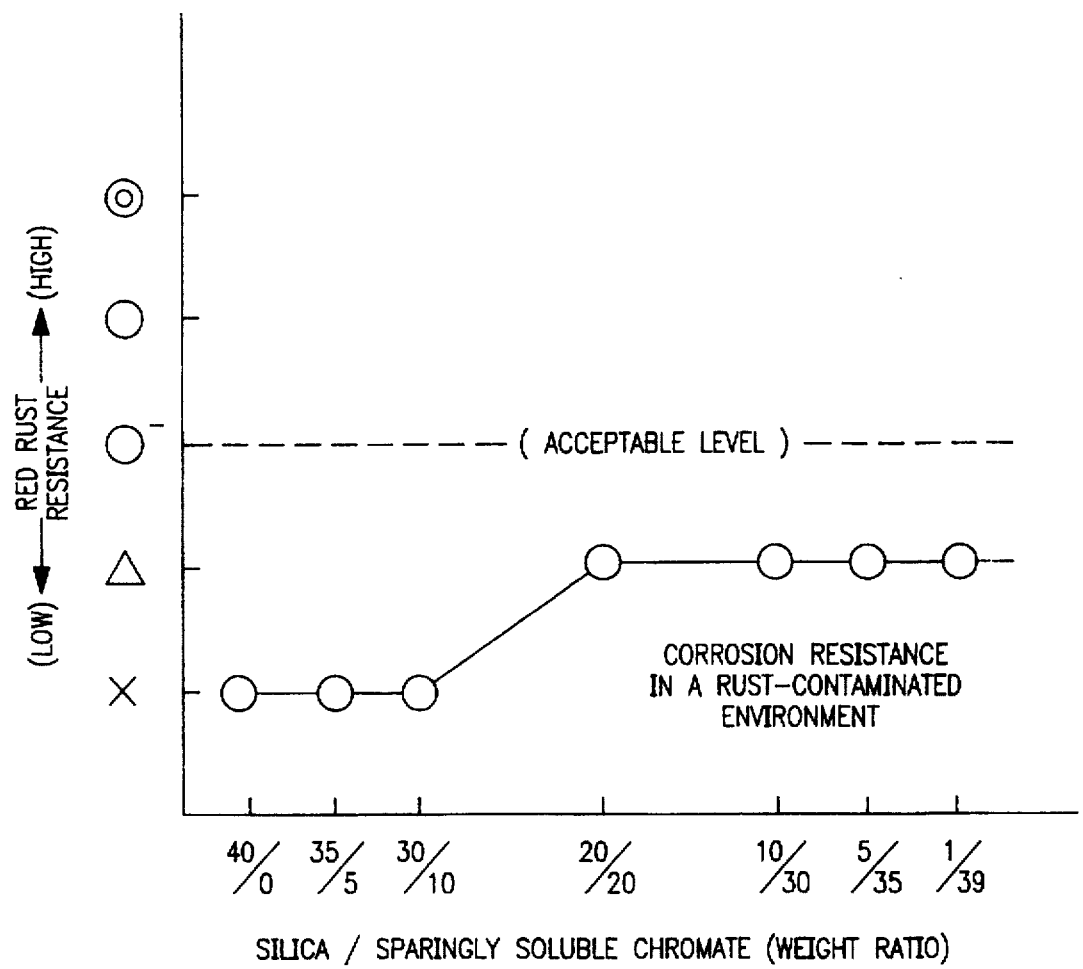
FIG. 6 is a graph showing the corrosion resistance of coated steel sheets as determined in a rust-contaminated environment in relation to the ratio by weight of silica and a sparingly soluble chromate which were added to an organic resin containing a conventional diisocyanate compound as a curing agent.

FIG. 5 shows the perforation corrosion resistance of coated steel sheets as determined by 200 cycles of tests and their corrosion resistance in a rust-contaminated environment as determined by seven cycles of tests in relation to the ratio by weight of silica and a sparingly soluble chromate which were added to an organic resin comprising a specific base resin and a hexafunctional polyisocyanate compound of the isophorone diisocyanate series (No. 2 in Table 2). As is obvious therefrom, a low level of corrosion resistance in a rust-contaminated environment results from any ratio by weight of silica/sparingly soluble chromate exceeding 35/5, and a low level of perforation corrosion resistance from any ratio falling short of 1/39. It is, thus, obvious that the ratio of silica/sparingly soluble chromate is preferably from 35/5 to 1/39, and more preferably from 20/20 to 1/39. For the sake of comparison, FIG. 6 shows the corrosion resistance of coated steel sheets in a rust-contaminated environment in relation to the ratio by weight of silica and a sparingly soluble chromate which were added to an organic resin containing a conventional diisocyanate compound (HMDI) as the curing agent. It is obvious from the results shown in FIGS. 5 and 6 that the excellent corrosion resistance of the coated steel sheet according to this invention and its excellent perforation corrosion resistance owe themselves to the combined effects of the polyfunctional polyisocyanate compound and the silica and sparingly soluble chromate employed in the specific proportions.

Figure 7:
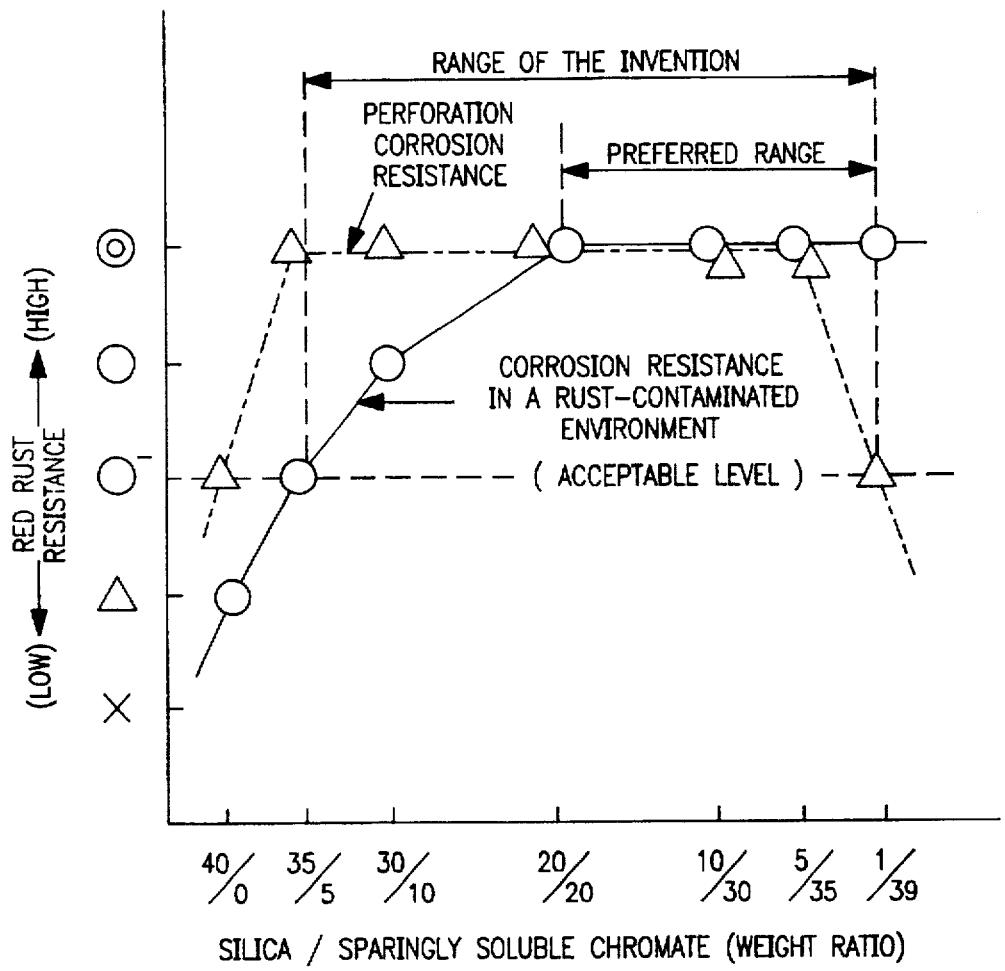
FIG. 7 is a graph showing the perforation corrosion resistance of coated steel sheets and their corrosion resistance as determined by 15 cycles of corrosion tests in a rust-contaminated environment in relation to the ratio by weight of silica and a sparingly soluble chromate which were added to an organic resin comprising a specific base resin and a hexafunctional polyisocyanate compound of the hexamethylene diisocyanate series.

FIG. 7 shows the perforation corrosion resistance of coated steel sheets as determined by 200 cycles of tests and their corrosion resistance in a rust-contaminated environment as determined by 15 cycles of tests in relation to the ratio by weight of silica and a sparingly soluble chromate which were added to an organic resin containing a hexafunctional polyisocyanate compound of the hexamethylene diisocyanate series as the curing agent. It is obvious therefrom that the ratio of silica/sparingly soluble chromate is preferably from 35/5 to 1/39, and more preferably from 20/20 to 1/39, as is the case when the hexafunctional polyisocyanate compound is of the isophorone diisocyanate type.

As is obvious from the description of Examples which will hereinafter appear (compare e.g. Nos. 66 and 70 in Example 2), it is possible to achieve a higher level of corrosion resistance in a rust-contaminated environment by employing a hexafunctional polyisocyanate compound of the hexamethylene diisocyanate series than by employing a compound of the isophorone diisocyanate series if the ratio of silica/sparingly soluble chromate is the same.

Although silica and a sparingly soluble chromate may be the principal additives to the resin composition, it may further contain, for example, at least one of a silane coupling agent, a color pigment (e.g. an organic pigment of the condensed polycyclic type, or of the phthalocyanine series), a color dye (e.g. an azo dye, or a dye in the form of a complex salt of an azo dye and a metal), a lubricant (e.g. polyethylene wax, teflon, graphite, or molybdenum disulfide), a rust-inhibitive pigment (e.g. aluminum dihydrogen tripolyphosphate, aluminum phosphomolybdate, or zinc phosphate), an electrically conductive pigment (e.g. iron phosphide, or antimony-doped tin oxide), and a surface active agent.

Figure 3:
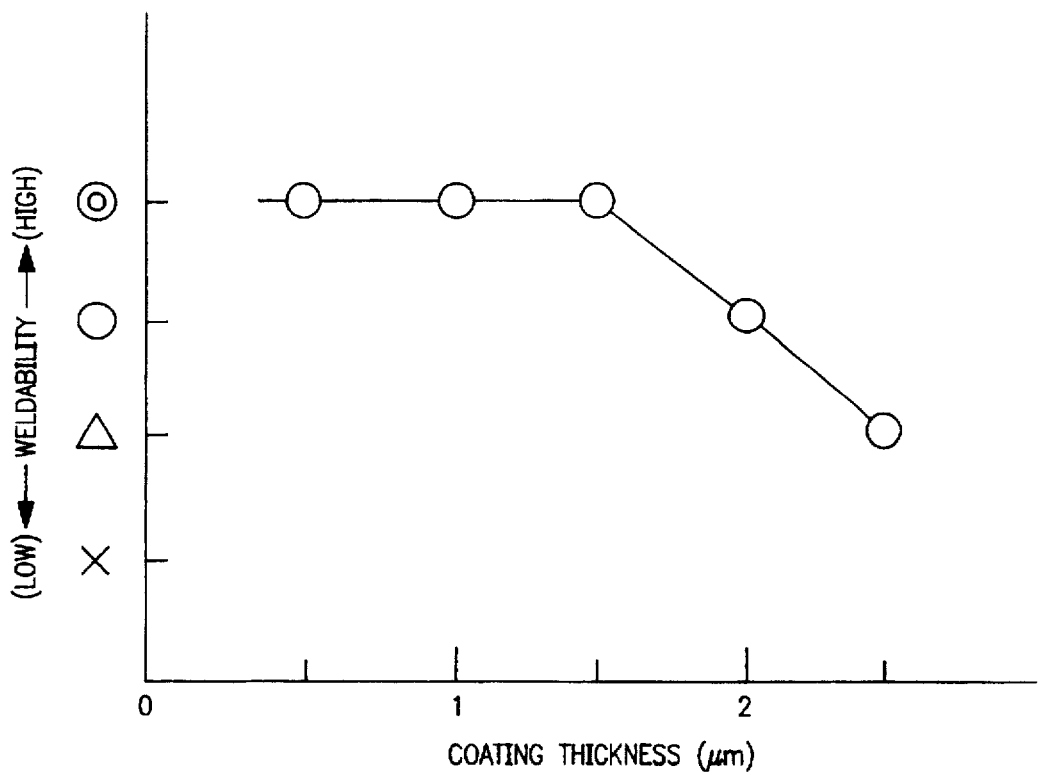
FIG. 3 is a graph showing the weldability of coated steel sheets in relation to the thickness of an organic resin film formed thereon.

The organic resin coating is formed on the chromate coating so as to have a film thickness of 0.2 to 2.0 microns, and a preferred film thickness of 0.5 to 1.5 microns. If its thickness is smaller than 0.2 micron, it is impossible to achieve any satisfactorily high corrosion resistance in a rust-contaminated environment, and if its thickness exceeds 2.0 microns, it brings about an undesirable lowering of weldability (particularly, continuous spot weldability). FIG. 3 shows the results obtained by comparing spot weldability (continuous) with the thickness of the organic resin coating. It is obvious therefrom that the coating thickness exceeding 2.0 microns brings about an undesirable lowering of spot weldability.

A roll coater is usually employed for coating the steel sheet with the paint composition as described above, though it is also possible to apply the composition by dipping or spraying and regulate its coating weight with an air knife, or by roll squeezing. A hot-air, high-frequency induction, or infrared heating oven can, for example, be employed for heating the sheet coated with the composition. It is heated to a temperature of from 80° C. to 250° C., and preferably from 100° C. to 200° C. If this invention is applied to a BH or bake hardenable steel sheet, it is preferably heated to a temperature not exceeding 150° C. It is a great advantage of the coated steel sheet of this invention that it can be manufactured by baking at such a low temperature.

No baking temperature lower than 80° C. can promote the crosslinking of the coating and achieve a satisfactorily high level of corrosion resistance. Baking at a high temperature over 250° C., however, results in a lower corrosion resistance. This is probably due to the fact that baking at a high temperature over 250° C. promotes the volatilization of water from the chromate layer and the condensation reaction of the hydroxyl groups

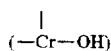
(—Cr—OH)

and thereby causes the destruction of the chromate layer by cracking and the reduction of hexavalent chromium resulting in the loss of its passivating action.

As cationic electrodeposition is usually employed for coating automobile bodies with a paint, and as the coated steel sheet of this invention is mainly used for making automobile bodies, the chromate and organic resin coatings are preferably so formed thereon as to have a total wet electrical resistance not exceeding 200 kiloohms per square centimeter so that a satisfactory layer of paint may be formed thereon by cationic electrodeposition.

The coated steel sheet of this invention may carry the films, layers or coatings on one or both sides thereof.

Thus, the coated steel sheet of this invention may, for example, have:

(1) a plating film, a chromate film and an organic resin film on one side thereof, while the other side is a steel surface;

(2) a plating film, a chromate film and an organic resin film on one side thereof and a plating film on the other side; or (3) a plating film, a chromate film and an organic resin film on both sides.

The organic composite coated steel sheet of this invention can be used not only for making automobile bodies, but also for making electric appliances, buildings, etc.

EXAMPLES

Zinc or zinc alloy plated steel sheets were degreased with an alkali, rinsed with water, dried, given chromating treatment, and coated with paint compositions by a roll coater, followed by their baking, to prepare organic composite coated steel sheets for making automobile bodies. The coated steel sheets were tested for corrosion resistance in a rust-contaminated environment, perforation corrosion resistance, paint adhesion, anti-powdering property and weldability. Tables 1 to 4 show the steel sheets, organic resins, sparingly soluble chromates and silica which were employed for preparing the coated steel sheets. Tables 5 to 12 show the results of Example 1, and Tables 13 to 22 show the results of Example 2.

The following is a description of the materials, methods and conditions employed in the preparation of the coated steel sheets:

[1] Zinc or zinc alloy plated steel sheets:

Cold rolled steel sheets having a thickness of 0.8 mm and a surface roughness ($R_a$) of 1.0 micron were plated with zinc or zinc alloys to provide the starting materials (see Table 1).

[2] Chromating treatment:

(1) Dried-in-place type chromate coating:

A chromating solution having the composition shown below was applied by a roll coater, and dried without rinsing with water. The coating weight of the chromate layer was controlled by varying the ratio in peripheral speed of the pickup and applicator rolls in the roll coater.

Chromic acid anhydride: 20 g/l.
Phosphoric acid ion: 4 g/l.
Zirconium fluoride ion: 1 g/l.
Zinc ion: 1 g/l.
Hexavalent chromium/trivalent chromium: 3/3 (by weight).
Chromic acid anhydride/zirconium fluoride ion: 20/1 (by weight).

(2) Electrolytic chromate coating:

A bath containing 30 g of chromic acid anhydride and 0.2 g of sulfuric acid per liter and having a temperature of 40° C. was used for cathode electrolysis at a current density of 10 A/dm² to form a chromate layer on the steel sheet and it was rinsed with water, and dried. The coating weight of the chromate layer was regulated by controlling the amount of the electric current employed for the electrolysis.

(3) Reacted-in-place type chromate coating:

A solution containing 30 g of chromic acid anhydride, 10 g of phosphoric acid, 0.5 g of NaF and 4 g of $K_2TiF_6$ per liter and having a temperature of 60° C. was sprayed on the steel sheet and it was rinsed with water, and dried. The coating weight of the chromate layer was controlled by varying the length of time spent for the treatment.

[3] organic resin:

The organic resins which were employed are shown in Table 2. The base resins and curing agents (polyisocyanates) appearing in the table were prepared by the processes described at (I) to (III) and (a) to (e) below.

[Base resin]

(I) A reaction vessel equipped with a ref lux condenser, a stirrer, a thermometer and a device for blowing nitrogen gas was charged with 1600 g of Epicoat 1004 (an epoxy resin of Shell Chemical Co., Ltd. having a molecular weight of about 1600), 57 g of pelargonic acid (reagent) and 80 g of xylene, and they were reacted at 170° C. Then, xylene was removed under a reduced pressure, whereby an intermediate reaction product [A] was obtained.

(II) A reaction vessel equipped with a stirrer, a reflux condenser, a thermometer and a liquid dropping device was charged with 1880 g (0.5 mol) of Epicoat 1009 (an epoxy resin of Shell Chemical Co., Ltd. having a molecular weight of about 3750) and 1000 g of a mixed solvent consisting of methyl isobutyl ketone and xylene in a ratio of 1/1 (by weight), and they were heated under stirring to form a uniform solution at a temperature below the boiling point of the solvent. Then, the solution was cooled to 70° C. and 70 g of di(n-propanol)amine was dropped into the solution in 30 minutes from the liquid dropping device. A reaction temperature of 70° C. was maintained until its dropping was finished. Then, the solution was held at 120° C. for two hours to complete the reaction. A resin A was obtained as the reaction product. The resin A contained 66% of effective component.

(III) The reaction vessel employed at (II) above was charged with 1650 g of the intermediate reaction product [A] and 1000 g of xylene, and after they had been heated to 100° C., 65 g of diethanolamine and 30 g of monoethanolamine were dropped into the vessel in 30 minutes from the liquid dropping device. Then, a temperature of 120° C. was maintained for two hours to complete the reaction. A resin B was obtained as the reaction product. The resin B contained 63% of effective component.

[Curing agent]

(a) Hexafunctional isocyanate:

A reaction vessel equipped with a thermometer, a stirrer and a reflux condenser having a dropping funnel was charged with 222 parts of isophorone diisocyanate and 34 parts of methyl isobutyl ketone, and after a uniform solution had been made, 87 parts of methyl ethyl ketone oxime was dropped in two hours from the funnel into the isocyanate solution held at 70° C. under stirring. After the addition of 30.4 parts of sorbitol, the solution was heated to 120° C. to complete the reaction. The examination of the reaction product by an infrared analyzer confirmed that there was no absorption by any isocyanate group at a wavelength of 2250 to 2270 cm$^{-1}$. The addition of 50.4 parts of butyl cellosolve to the reaction product yielded a curing agent a. The curing agent a contained 80% of effective component.

(b) Tetrafunctional isocyanate:

A reaction vessel equipped with a thermometer, a stirrer and a reflux condenser having a dropping funnel was charged with 222 parts of isophorone diisocyanate and 34 parts of methyl isobutyl ketone, and after a uniform solution has been made, 87 parts of methyl ethyl ketone oxime was dropped in two hours from the funnel into the isocyanate solution held at 70° C. under stirring. After the addition of 34 parts of pentaerythritol, the solution was heated to 120° C. to complete the reaction. The examination of the reaction product by an infrared analyzer confirmed that there was no absorption by any isocyanate group at a wavelength of 2250 to 2270 cm$^{-1}$. The addition of 52 parts of butyl cellosolve to the reaction product yielded a curing agent b. The curing agent b contained 80% of effective component.

(c) Trifunctional isocyanate:

A reaction vessel equipped with a thermometer, a stirrer and a reflux condenser having a dropping funnel was charged with 550 parts of Duranate TPA-100 (product of Asahi Chemical Industrial Co., Ltd., HMDI of the isocyanuric ring type) and 34 parts of methyl isobutyl ketone, and after a uniform solution had been made, 270 parts of methyl ethyl ketone oxime was dropped in two hours from the funnel into the isocyanate solution held at 70° C. under stirring. The examination of the reaction product by an infrared analyzer confirmed that there was no absorption by any isocyanate group at a wavelength of 2250 cm$^{-1}$. The addition of 47 parts of butyl cellosolve to the reaction product yielded a curing agent c. The curing agent c contained 90% of (d) Difunctional isocyanate:

Takenate B-870N (product of Takeda Chemical Industries, Ltd.; a MEK oxime-blocked product of IPDI) was employed as a curing agent d.

(e) Duranate MF-B80M (product of Asahi Chemical Industrial Co., Ltd.; an oxime-blocked product of a hexafunctional isocyanate compound of the hexamethylene diisocyanate series) was employed as a curing agent e.

The following is a description of the method employed for testing and evaluating the organic composite coated steel sheets for various properties:

(a) Corrosion resistance (perforation):

After a sealing tape had been applied to the edges and rear surface of each unpainted test specimen, a cross cut was made in its lower half surface and it was given 200 cycles of a cyclic corrosion test each consisting of:

Spraying a 5% NaCl solution at 35° C. (for 4 hours);
drying at 60° C. (for 2 hours);
leaving at a RH of 95% and 50° C. (for 4 hours).

The results are shown by these symbols:

◎: No red rust formed;

○+: Red rust covered only an area of less than 5%;

○: Red rust covered only an area of from 5%, inclusive, to 10%, exclusive;

○−: Red rust covered an area of from 10%, inclusive, to 20%, exclusive;

Δ: Red rust covered an area of from 20%, inclusive, to 50%, exclusive;

×: Red rust covered an area of 50% or more.

(b) Corrosion resistance in a rust-contaminated environment:

After a sealing tape had been applied to the edges and rear surface of each unpainted test specimen, it was given a cyclic corrosion test in the presence of iron rust. Each of specimens Nos. 1 to 50 in Example 1 and Nos. 1 to 65 in Example 2 was examined after 7 cycles of the test for any rust formed thereon, and each of Nos. 51 to 94 in Example 1 and Nos. 66 to 124 in Example 2 after 15 cycles. Each cycle consisted of:

Dipping in a 5% NaCl solution at 50° C. in the presence of iron rust (*) (for 18 hours); leaving at a RH of 95% and 50° C. (for 3 hours); and drying at 60° C. (for 3 hours).

(*) Iron rust was supplied by dipping a cold rolled steel sheet having an area of 10 cm$^2$ per liter of salt solution.

The results are shown by these symbols:

◎: No red rust formed;

○: Red rust covered only an area of less than 10%;

○−: Red rust covered only an area of from 10%, inclusive, to 20%, exclusive;

Δ: Red rust covered an area of from 20%, inclusive, to 50%, exclusive;

×: Red rust covered an area of 50% or more.

(c) Paint adhesion:

Each test specimen was coated with an electrodeposited layer of U-600, product of Nippon Paint Co., Ltd., having a thickness of 25 microns and a top coat of LUGA BAKE B-531, product of Kansai Paint Co., Ltd., having a thickness of 35 microns. It was immersed in ion-exchange water having a temperature of 40° C., and removed from it after 240 hours. After it had been left to stand at room temperature for 24 hours, 100 checkers each measuring 2 mm square were made in the coating and an adhesive tape was attached to, and detached from, the coating to see how the coating would peel off. The results are shown by these symbols:

◎: No peeling occurred;

○: Only less than 3% of the coating peeled off;

Δ: From 3%, inclusive, to 10%, exclusive, of the coating peeled off;

×: 10% or more of the coating peeled off.

(d) Weldability:

A continuous spot welding test was made on each specimen by employing a CF electrode, an electrode force of 200 kgf, a weld time of 10 cycles/50 Hz and a welding current of 10 kA, and the number of the spots which could be made continuously on the specimen was counted as a measure of its weldability. The results are shown by these symbols:

◎: 5000 or more;

○: From 4000, inclusive, to 5000, exclusive;

Δ: From 3000, inclusive, to 4000, exclusive;

×: Less than 3000.

Example 1

Tables 5 to 12 show the test results of the organic composite coated steel sheets containing a sparingly soluble chromate as the rust-preventing additive in the organic resin coating.

Example 1 confirms the excellent corrosion resistance in a rust-contaminated environment of the organic composite coated steel sheets of this invention, and particularly, those obtained by employing as the curing agent poly-functional polyisocyanates having at least four, and preferably at least six, isocyanate groups per molecule. Moreover, the results of Samples Nos. 51 to 53 and Nos. 55 to 57 in Table 9 confirm that a higher level of corrosion resistance in a rust-contaminated environment can be obtained when the hexafunctional polyisocyanate compound employed as the curing agent is of the hexamethylene diisocyanate type, than when it is of the isophorone diisocyanate type.

Example 2

Tables 13 to 22 show the test results of the organic composite coated steel sheets containing a sparingly soluble chromate and silica as the rust-preventing additive in the organic resin coating.

Example 2 confirms the excellent corrosion resistance in a rust-contaminated environment of the organic composite coated steel sheets of this invention, and particularly, those obtained by employing as the curing agent poly-functional polyisocyanates having at least four, and preferably at least six, isocyanate groups per molecule. Moreover, the results of Samples Nos. 66 to 68 and Nos. 70 to 72 in Table 18 confirm that a higher level of corrosion resistance in a rust-contaminated environment can be obtained when the hexafunctional polyisocyanate compound employed as the curing agent is of the hexamethylene diisocyanate type, than when it is of the isophorone diisocyanate type.

TABLE 1

| No. | Plated Steel Sheet |
|---|---|
| 1 | Zn-12%Ni alloy electraplated steel sheet (coating weight 30 g/m$^2$) |
| 2 | Zn-15%Fe alloy electraplated steel sheet (coating weight 40 g/m$^2$) |
| 3 | Electragalvanized steel sheet (coating weight 40 g/m$^2$) |
| 4 | Hot-dipped galvanized steel sheet (coating weight 90 g/m$^2$) |
| 5 | Galvannealed steel sheet (coating weight 60 g/m$^2$) |
| 6 | Two layer galvannealed steel sheet (coating weight 30 g/m$^2$) |
| 7 | Zn-5%Al-0.5%Mo alloy plated steel sheet made by hot dipping (coating weight 90 g/m$^2$) |
| 8 | Zn-60%Mn alloy electraplated steel sheet (coating weight 30 g/m$^2$) |
| 9 | Zn-12%Cr-2%Ni alloy electraplated steel sheet (coating weight 20 g/m$^2$) |
| 10 | Zn-12%Cr alloy electraplated steel sheet (coating weight 20 g/m$^2$) |

TABLE 2

| | Base resin | | Curing agent | | | |
|---|---|---|---|---|---|---|
| No. | Kind | Proportion (parts) | Kind | Proportion (parts) | Curing catalyst and proportion | Division |
| 1 | A | 100 | a | 5 | Dibutyltin dilaurate 0.2 parts | Inv. |
| 2 | A | 100 | a | 25 | Dibutyltin dilaurate 1.0 parts | Inv. |
| 3 | A | 100 | b | 25 | — | Inv. |
| 4 | A | 100 | b | 50 | Dibutyltin dilaurate 2.0 parts | Inv. |
| 5 | A | 100 | c | 50 | Dibutyltin dilaurate 3.0 parts | Inv. |
| 6 | A | 100 | c | 80 | Dibutyltin dilaurate 4.0 parts | Inv. |
| 7 | A | 100 | b | 25 | Cobalt naphthenate 1.0 parts | Inv. |
| 8 | B | 100 | a | 10 | Cobalt naphthenate 2.0 parts | Inv. |
| 9 | B | 100 | b | 50 | Stannous chloride 1.0 parts | Inv. |
| 10 | B | 100 | c | 25 | N-ethylmorpholine 2.0 parts | Inv. |
| 11 | B | 100 | — | — | — | Com. |
| 12 | A | 100 | a | 100 | Dibutyltin dilaurate 1.0 parts | Com. |
| 13 | A | 100 | d | 25 | Dibutyltin dilaurate 1.0 parts | Com. |
| 14 | A | 100 | e | 5 | Dibutyltin dilaurate 0.2 parts | Inv. |
| 15 | A | 100 | e | 25 | Dibutyltin dilaurate 1.0 parts | Inv. |
| 16 | A | 100 | e | 10 | Cobalt naphthenate 2.0 parts | Inv. |
| 17 | A | 100 | e | 100 | Dibutyltin dilaurate 1.0 parts | Com. |

Note: Parts by weight of solid matter

The following is an explanation of what is meant by *1 to *7 in Tables 5 to 22:

*1 : "Inv." means a sample of this invention, while "Com." means a comparative sample;

*2 : The numbers correspond to those appearing in Table 1 as identifying the plated steel sheets;

*3 : Each number represents the coating weight of the chromate layer in terms of metallic chromium;

*4 : The numbers correspond to those appearing in Table 2 as identifying the organic resins;

*5 : The numbers correspond to those appearing in Table 3 as identifying the sparingly soluble chromates;

*6 : The numbers correspond to those appearing in Table 4 as identifying the different types of silica; and

*7 : The ratio by weight of nonvolatile matter.

INDUSTRIAL UTILITY

The organic composite coated steel sheet of this invention is useful as a material for automobile bodies, electric appliances, etc.

TABLE 3

| No. | Name |
|---|---|
| 1 | Barium chromate made by Kikuchi Pigment Industrial Co., Ltd. |
| 2 | Strontium chromate made by Kikuchi Pigment Industrial Co., Ltd. |
| 3 | Calcium chromate made by Kikuchi Pigment Industrial Co., Ltd. |
| 4 | Zinc chromate (ZTO) made by Kikuchi Pigment Industrial Co., Ltd. |
| 5 | Potassium zinc chromate (ZPC) made by Kikuchi Pigment Industrial Co., Ltd. |

TABLE 4

| No. | Name |
|---|---|
| 1 | AEROSIL R811 made by Nippon Aerosil Co., Ltd. (Fumed silica; hydrophobic) |
| 2 | AEROSIL R974 made by Nippon Aerosil Co., Ltd. (Fumed silica; hydrophobic) |
| 3 | AEROSIL R805 made by Nippon Aerosil Co., Ltd. (Fumed silica; hydrophobic) |
| 4 | AEROSIL R202 made by Nippon Aerosil Co., Ltd. (Fumed silica; hydrophobic) |

TABLE 4-continued

| No. | Name |
|-----|------|
| 5 | AEROSIL 200 made by Nippon Aerosil Co., Ltd. (Fumed silica; hydrophilic) |
| 6 | AEROSIL 380 made by Nippon Aerosil Co., Ltd. (Fumed silica; hydrophilic) |
| 7 | ETC-ST made by Nissan Chemical Industries., Ltd. (organoisilica sol; hydrophilic) |
| 8 | Fine Seal T-32(S) made by Tokuyama Soda Co., Ltd. (Silica of a precipitated type, obtained by reaction of sodium silicate and mineral acids; hydrophilic) |
| 9 | Syloid 244 made by Fuji-Davison Chemical, Ltd. (Silica of a gel type, obtained by reaction of sodium silicate and mineral acids; hydrophilic) |
| 10 | SHIELDEX made by Fuji-Davison Chemical Ltd. (calcium-exchanged silica; hydrophilic) |

TABLE 5

<Example 1>

| No. | Division *1 | Base material *2 | Chromate film Forming method | Weight (mg/m²) *3 | Organic film Organic resin *4 | Sparingly soluble chromate *5 | Organic resin/ Sparingly soluble chromate *7 | Thickness (µm) | Baking temperature (°C.) | Corrosion resistance (perforation) | Corrosion resistance in a rust-contaminated environment | Adhesion | Anti-powdering property | Weldability |
|---|---|---|---|---|---|---|---|---|---|---|---|---|---|---|
| 1 | Inv. | 1 | Dried-in-place | 50 | 1 | 1 | 60/40 | 0.8 | 110 | ⊙ | ⊙ | ⊙ | ⊙ | ⊙ |
| 2 | " | " | Dried-in-place | " | 2 | " | " | " | " | ⊙ | ⊙ | ⊙ | ⊙ | ⊙ |
| 3 | " | " | Dried-in-place | " | 3 | " | " | " | " | ⊙ | ○ | ⊙ | ⊙ | ⊙ |
| 4 | " | " | Dried-in-place | " | 4 | " | " | " | " | ⊙ | ○ | ⊙ | ⊙ | ⊙ |
| 5 | " | " | Dried-in-place | " | 5 | " | " | " | " | ⊙ | ○– | ⊙ | ⊙ | ⊙ |
| 6 | " | " | Dried-in-place | " | 6 | " | " | " | " | ⊙ | ○– | ⊙ | ⊙ | ⊙ |
| 7 | " | " | Dried-in-place | " | 7 | " | " | " | " | ⊙ | ○ | ⊙ | ⊙ | ⊙ |
| 8 | " | " | Dried-in-place | " | 8 | " | " | " | " | ⊙ | ⊙ | ⊙ | ⊙ | ⊙ |
| 9 | " | " | Dried-in-place | " | 9 | " | " | " | " | ⊙ | ○ | ⊙ | ⊙ | ⊙ |
| 10 | " | " | Dried-in-place | " | 10 | " | " | " | " | ⊙ | ○– | ⊙ | ⊙ | ⊙ |
| 11 | Com. | " | Dried-in-place | " | 11 | " | " | " | " | X | X | X | ⊙ | ⊙ |
| 12 | " | " | Dried-in-place | " | 12 | " | " | " | " | Δ | Δ | ⊙ | ⊙ | ⊙ |
| 13 | " | " | Dried-in-place | " | 13 | " | " | " | " | ⊙ | X | ⊙ | ⊙ | ⊙ |

Note: Corrosion resistance in a rust-contaminated environment is shown by the results of evaluation made after 7 cycles of a corrosion test.

TABLE 6

<Example 1>

| No. | Division *1 | Base material *2 | Chromate film Forming method | Chromate film Weight (mg/m²) *3 | Organic film Organic resin *4 | Organic film Sparingly soluble chromate *5 | Organic film Organic resin/ Sparingly soluble chromate *7 | Organic film Thickness (μm) | Baking temperature (°C.) | Properties Corrosion resistance (perforation) | Properties Corrosion resistance in a rust-contaminated environment | Properties Adhesion | Properties Anti-powdering property | Properties Weldability |
|---|---|---|---|---|---|---|---|---|---|---|---|---|---|---|
| 14 | Inv. | 2 | Dried-in-place | 50 | 1 | 1 | 60/40 | 0.8 | 110 | ◎ | ○ | ◎ | ◎ | ◎ |
| 15 | " | 3 | Dried-in-place | " | " | " | " | " | " | ◎ | ○ | ○ | ◎ | ○ |
| 16 | " | 4 | Dried-in-place | " | " | " | " | " | " | ◎ | ○ | ◎ | ◎ | Δ |
| 17 | " | 5 | Dried-in-place | " | " | " | " | " | " | ◎ | ○ | ◎ | ◎ | ○ |
| 18 | " | 6 | Dried-in-place | " | " | " | " | " | " | ◎ | ○ | ◎ | ◎ | ◎ |
| 19 | " | 7 | Dried-in-place | " | " | " | " | " | " | ◎ | ○ | ◎ | ◎ | Δ |
| 20 | " | 8 | Dried-in-place | " | " | " | " | " | " | ◎ | ○ | ◎ | ◎ | ◎ |
| 21 | " | 9 | Dried-in-place | " | " | " | " | " | " | ◎ | ○ | ◎ | ◎ | ◎ |
| 22 | " | 10 | Dried-in-place | " | " | " | " | " | " | ◎ | ○ | ◎ | ◎ | ◎ |
| 23 | " | 1 | Electolytic | " | " | " | " | " | " | ○ | ○ | ◎ | ◎ | ◎ |
| 24 | " | " | Reacted-in-place | " | " | " | " | " | " | ○ | ○ | ◎ | ◎ | ◎ |
| 25 | Com. | " | Dried-in-place | 5 | " | " | " | " | " | ○− | ○− | ◎ | ◎ | ◎ |

Note: Corrosion resistance in a rust-contaminated environment is shown by the results of evaluation made after 7 cycles of a corrosion test.

TABLE 7

<Example 1>

| No. | Division *1 | Base material *2 | Chromate film Forming method | Chromate film Weight (mg/m²) *3 | Organic film Organic resin *4 | Organic film Sparingly soluble chromate *5 | Organic film Organic resin/ Sparingly soluble chromate *7 | Organic film Thickness (μm) | Baking temperature (°C.) | Properties Corrosion resistance (perforation) | Properties Corrosion resistance in a rust-contaminated environment | Properties Adhesion | Properties Anti-powdering property | Properties Weldability |
|---|---|---|---|---|---|---|---|---|---|---|---|---|---|---|
| 26 | Inv. | 1 | Dried-in-place | 10 | 1 | 1 | 60/40 | 0.8 | 110 | ○ | ○ | ◎ | ◎ | ◎ |
| 27 | " | " | Dried-in-place | 20 | " | " | " | " | " | ◎ | ◎ | ◎ | ◎ | ◎ |
| 28 | " | " | Dried-in-place | 100 | " | " | " | " | " | ◎ | ◎ | ◎ | ◎ | ◎ |
| 29 | " | " | Dried-in-place | 200 | " | " | " | " | " | ◎ | ◎ | ◎ | ◎ | ◎ |
| 30 | Com. | " | Dried-in-place | 300 | " | " | " | " | " | ◎ | ◎ | ◎ | ◎ | X |
| 31 | Inv. | " | Dried-in-place | 50 | " | 2 | " | " | " | ◎ | ◎ | ◎ | ◎ | ◎ |
| 32 | " | " | Dried-in-place | " | " | 3 | " | " | " | ◎ | ◎ | ◎ | ◎ | ◎ |
| 33 | " | " | Dried-in-place | " | " | 4 | " | " | " | ◎ | ◎ | ◎ | ◎ | ◎ |
| 34 | " | " | Dried-in-place | " | " | 5 | " | " | " | ◎ | ◎ | ◎ | ◎ | ◎ |
| 35 | " | " | Dried-in-place | " | " | 1 | 90/10 | " | " | ○ | ○− | ◎ | ◎ | ◎ |
| 36 | " | " | Dried-in-place | " | " | " | 40/60 | " | " | ◎ | ◎ | ◎ | ◎ | ◎ |

TABLE 7-continued

<Example 1>

| | | | Chromate film | | Organic film | | | | | Properties | | | | |
|---|---|---|---|---|---|---|---|---|---|---|---|---|---|---|
| | | Base | | | | | Organic resin/ Sparingly | | | | | Corrosion resistance | | Anti- | |
| No. | Division *1 | material *2 | Forming method | Weight (mg/m²) *3 | Organic resin *4 | Sparingly soluble chromate *5 | soluble chromate *7 | Thickness (μm) | Baking temperature (°C.) | Corrosion resistance (perforation) | in a rust-contaminated environment | Adhesion | powdering property | Weldability |
| 37 | Com. | " | Dried-in-place | " | " | " | 95/5 | " | " | Δ | X | ⊚ | ⊚ | ⊚ |
| 38 | " | " | Dried-in-place | " | " | " | 30/70 | " | " | ⊚ | ○ | X | Δ | ○ |

Note: Corrosion resistance in a rust-contaminated environment is shown by the results of evaluation made after 7 cycles of a corrosion test.

TABLE 8

<Example 1>

| | | | Chromate film | | Organic film | | | | | Properties | | | | |
|---|---|---|---|---|---|---|---|---|---|---|---|---|---|---|
| | | Base | | | | | Organic resin/ Sparingly | | | | | Corrosion resistance | | Anti- | |
| No. | Division *1 | material *2 | Forming method | Weight (mg/m²) *3 | Organic resin *4 | Sparingly soluble chromate *5 | soluble chromate *7 | Thickness (μm) | Baking temperature (°C.) | Corrosion resistance (perforation) | in a rust-contaminated environment | Adhesion | powdering property | Weldability |
| 39 | Inv. | 1 | Dried-in-place | 50 | 1 | 1 | 60/40 | 0.2 | 110 | ○ | ○− | ⊚ | ⊚ | ⊚ |
| 40 | " | " | Dried-in-place | " | " | " | " | 0.3 | " | ⊚ | ○ | ⊚ | ⊚ | ⊚ |
| 41 | " | " | Dried-in-place | " | " | " | " | 1.5 | " | ⊚ | ⊚ | ⊚ | ⊚ | ⊚ |
| 42 | " | " | Dried-in-place | " | " | " | " | 2.0 | " | ⊚ | ⊚ | ⊚ | ⊚ | ○ |
| 43 | Com. | " | Dried-in-place | " | " | " | " | 0.1 | " | X | X | ⊚ | ⊚ | ⊚ |
| 44 | " | " | Dried-in-place | " | " | " | " | 2.5 | " | ⊚ | ⊚ | ⊚ | ⊚ | Δ |
| 45 | Inv. | " | Dried-in-place | " | " | " | " | 0.8 | 80 | ○ | ○ | ⊚ | ⊚ | ⊚ |
| 46 | " | " | Dried-in-place | " | " | " | " | " | 100 | ⊚ | ⊚ | ⊚ | ⊚ | ⊚ |
| 47 | " | " | Dried-in-place | " | " | " | " | " | 200 | ⊚ | ⊚ | ⊚ | ⊚ | ⊚ |
| 48 | " | " | Dried-in-place | " | " | " | " | " | 250 | ○ | ○ | ⊚ | ⊚ | ⊚ |
| 49 | Com. | " | Dried-in-place | " | " | " | " | " | 40 | X | X | ⊚ | X | ⊚ |
| 50 | " | " | Dried-in-place | " | " | " | " | " | 300 | Δ | X | ⊚ | ⊚ | ⊚ |

Note: Corrosion resistance in a rust-contaminated environment is shown by the results of evaluation made after 7 cycles of a corrosion test.

TABLE 9

<Example 1>

| | | | Chromate film | | Organic film | | | | | Properties | | | | |
|---|---|---|---|---|---|---|---|---|---|---|---|---|---|---|
| | | | | | | | Organic resin/ | | | | Corrosion resistance | | | |
| No. | Division *1 | Base material *2 | Forming method | Weight (mg/m²) *3 | Organic resin *4 | Sparingly soluble chromate *5 | Sparingly soluble chromate *7 | Thickness (μm) | Baking temperature (°C.) | Corrosion resistance (perforation) | in a rust-contaminated environment | Adhesion | Anti-powdering property | Weldability |
| 51 | Inv. | 1 | Dried-in-place | 50 | 14 | 1 | 60/40 | 0.8 | 110 | ◉ | ◎ | ◎ | ◎ | ◉ |
| 52 | " | " | Dried-in-place | " | 15 | " | " | " | " | ◉ | ◎ | ◎ | ◎ | ◉ |
| 53 | " | " | Dried-in-place | " | 16 | " | " | " | " | ◉ | ◎ | ◉ | ◎ | ◎ |
| 54 | Com. | " | Dried-in-place | " | 17 | " | " | " | " | Δ | Δ | ◎ | ◎ | ◎ |
| 55 | Inv. | " | Dried-in-place | " | 1 | " | " | " | " | ◉ | ○ | ◎ | ○ | ◎ |
| 56 | " | " | Dried-in-place | " | 2 | " | " | " | " | ◉ | ○ | ◎ | ○ | ◎ |
| 57 | " | " | Dried-in-place | " | 8 | " | " | " | " | ◉ | ○ | ◎ | ◎ | ◉ |

Notes:
(1) Corrosion resistance in a rust-contaminated environment is shown by the results of evaluation made after 15 cycles of a corrosion test.
(2) Although Nos. 55, 56 and 57 are of the same coating composition with Nos. 1, 2 and 8, respectively, 15 cycles of a corrosion resistance test in a rust-contaminated environment were given to Nos. 55 to 57, while Nos. 1, 2 and 8 were given 7 cycles of the same test.

TABLE 10

<Example 1>

| | | | Chromate film | | Organic film | | | | | Properties | | | | |
|---|---|---|---|---|---|---|---|---|---|---|---|---|---|---|
| | | | | | | | Organic resin/ | | | | Corrosion resistance | | | |
| No. | Division *1 | Base material *2 | Forming method | Weight (mg/m²) *3 | Organic resin *4 | Sparingly soluble chromate *5 | Sparingly soluble chromate *7 | Thickness (μm) | Baking temperature (°C.) | Corrosion resistance (perforation) | in a rust-contaminated environment | Adhesion | Anti-powdering property | Weldability |
| 58 | Inv. | 2 | Dried-in-place | 50 | 14 | 1 | 60/40 | 0.8 | 110 | ◉ | ◎ | ◎ | ◎ | ◉ |
| 59 | " | 3 | Dried-in-place | " | " | " | " | " | " | ◉ | ◎ | ◎ | ◎ | ○ |
| 60 | " | 4 | Dried-in-place | " | " | " | " | " | " | ◉ | ◎ | ◎ | ◎ | Δ |
| 61 | " | 5 | Dried-in-place | " | " | " | " | " | " | ◉ | ◎ | ◎ | ◎ | ○ |
| 62 | " | 6 | Dried-in-place | " | " | " | " | " | " | ◉ | ◎ | ◎ | ◎ | ◎ |
| 63 | " | 7 | Dried-in-place | " | " | " | " | " | " | ◉ | ◎ | ◎ | ◎ | Δ |
| 64 | " | 8 | Dried-in-place | " | " | " | " | " | " | ◉ | ◎ | ◎ | ◎ | ◎ |
| 65 | " | 9 | Dried-in-place | " | " | " | " | " | " | ◉ | ◎ | ◎ | ◎ | ◎ |
| 66 | " | 10 | Dried-in-place | " | " | " | " | " | " | ◉ | ◎ | ◎ | ◎ | ◎ |
| 67 | " | 1 | Electolytic | " | " | " | " | " | " | ○ | ○ | ◎ | ◎ | ◎ |
| 68 | " | " | Reacted-in-place | " | " | " | " | " | " | ○ | ○ | ◎ | ◎ | ◎ |
| 69 | Com. | " | Dried-in-place | 5 | " | " | " | " | " | ○− | ○− | ◎ | ◎ | ◎ |

Note: Corrosion resistance in a rust-contaminated environment is shown by the results of evaluation made after 15 cycles of a corrosion test.

TABLE 11

<Example 1>

| | | | Organic film | | | | | | Properties | | | | |
|---|---|---|---|---|---|---|---|---|---|---|---|---|---|
| | Base | Chromate film | | Or- | Sparingly | Organic resin/ Sparingly | | Baking | Corrosion | Corrosion resistance | Anti- | | |
| No. | Division *1 | material *2 | Forming method | Weight (mg/m²) *3 | ganic resin *4 | soluble chromate *5 | soluble chromate *7 | Thickness (μm) | temperature (°C.) | resistance (perforation) | in a rust-contaminated environment | Adhesion | powdering property | Weldability |
| 70 | Inv. | 1 | Dried-in-place | 10 | 14 | 1 | 60/40 | 0.8 | 110 | ○ | ○ | ⊙ | ⊙ | ⊙ |
| 71 | " | " | Dried-in-place | 20 | " | " | " | " | " | ⊙ | ○ | ⊙ | ⊙ | ⊙ |
| 72 | " | " | Dried-in-place | 100 | " | " | " | " | " | ⊙ | ⊙ | ⊙ | ⊙ | ○ |
| 73 | " | " | Dried-in-place | 200 | " | " | " | " | " | ⊙ | ⊙ | ⊙ | ⊙ | ○ |
| 74 | Com. | " | Dried-in-place | 300 | " | " | " | " | " | ⊙ | ⊙ | ⊙ | ⊙ | X |
| 75 | Inv. | " | Dried-in-place | 50 | " | 2 | " | " | " | ⊙ | ⊙ | ⊙ | ⊙ | ⊙ |
| 76 | " | " | Dried-in-place | " | " | 3 | " | " | " | ⊙ | ⊙ | ⊙ | ⊙ | ⊙ |
| 77 | " | " | Dried-in-place | " | " | 4 | " | " | " | ⊙ | ⊙ | ⊙ | ⊙ | ⊙ |
| 78 | " | " | Dried-in-place | " | " | 5 | " | " | " | ⊙ | ⊙ | ⊙ | ⊙ | ⊙ |
| 79 | " | " | Dried-in-place | " | " | 1 | 90/10 | " | " | ○ | ○- | ⊙ | ⊙ | ⊙ |
| 80 | " | " | Dried-in-place | " | " | " | 40/60 | " | " | ⊙ | ⊙ | ⊙ | ⊙ | ⊙ |
| 81 | Com. | " | Dried-in-place | " | " | " | 95/5 | " | " | Δ | X | ⊙ | ⊙ | ⊙ |
| 82 | " | " | Dried-in-place | " | " | " | 30/70 | " | " | ⊙ | ⊙ | X | Δ | ⊙ |

Note: Corrosion resistance in a rust-contaminated environment is shown by the results of evaluation made after 15 cycles of a corrosion test.

TABLE 12

<Example 1>

| | | | Organic film | | | | | | Properties | | | | |
|---|---|---|---|---|---|---|---|---|---|---|---|---|---|
| | Base | Chromate film | | Or- | Sparingly | Organic resin/ Sparingly | | Baking | Corrosion | Corrosion resistance | Anti- | | |
| No. | Division *1 | material *2 | Forming method | Weight (mg/m²) *3 | ganic resin *4 | soluble chromate *5 | soluble chromate *7 | Thickness (μm) | temperature (°C.) | resistance (perforation) | in a rust-contaminated environment | Adhesion | powdering property | Weldability |
| 83 | Inv. | 1 | Dried-in-Place | 50 | 14 | 1 | 60/40 | 0.2 | 110 | ○ | ○- | ⊙ | ⊙ | ⊙ |
| 84 | " | " | Dried-in-Place | " | " | " | " | 0.3 | " | ⊙ | ○ | ⊙ | ⊙ | ⊙ |
| 85 | " | " | Dried-in-Place | " | " | " | " | 1.5 | " | ⊙ | ⊙ | ⊙ | ⊙ | ⊙ |
| 86 | " | " | Dried-in-Place | " | " | " | " | 2.0 | " | ⊙ | ⊙ | ⊙ | ⊙ | ○ |
| 87 | Com. | " | Dried-in-Place | " | " | " | " | 0.1 | " | X | X | ⊙ | ⊙ | ⊙ |
| 88 | " | " | Dried-in-Place | " | " | " | " | 2.5 | " | ⊙ | ⊙ | ⊙ | ⊙ | Δ |
| 89 | Inv. | " | Dried-in-Place | " | " | " | " | 0.8 | 80 | ○ | ○ | ⊙ | ⊙ | ⊙ |
| 90 | " | " | Dried-in-Place | " | " | " | " | " | 100 | ⊙ | ⊙ | ⊙ | ⊙ | ⊙ |
| 91 | " | " | Dried-in-Place | " | " | " | " | " | 200 | ⊙ | ⊙ | ⊙ | ⊙ | ⊙ |
| 92 | " | " | Dried-in-Place | " | " | " | " | " | 250 | ○ | ○ | ⊙ | ⊙ | ⊙ |

TABLE 12-continued

<Example 1>

| | | | Organic film | | | | | | | Properties | | | | |
|---|---|---|---|---|---|---|---|---|---|---|---|---|---|---|
| | | | Chromate film | | Organic | | | | | | Corrosion resistance | | Anti- | |
| No. | Division *1 | Base material *2 | Forming method | Weight (mg/m²) *3 | Organic resin *4 | Sparingly soluble chromate *5 | resin/ Sparingly soluble chromate *7 | Thickness (μm) | Baking temperature (°C.) | Corrosion resistance (perforation) | in a rust-contaminated environment | Adhesion | powdering property | Weldability |
| 93 | Com. | " | Dried-in-Place | " | " | " | " | " | 40 | X | X | ⊚ | X | ⊚ |
| 94 | " | " | Dried-in-Place | " | " | " | " | " | 300 | Δ | ○X | ⊚ | ⊚ | ⊚ |

Note: Corrosion resistance in a rust-contaminated environment is shown by the results of evaluation made after 15 cycles of a corrosion test.

TABLE 13

<Example 2>

| | | | Organic film | | | | | | | | |
|---|---|---|---|---|---|---|---|---|---|---|---|
| | | | Chromate film | | | | Sparingly | Organic resin/ (Silica + Sparingly | Silica/ Sparingly | | Baking |
| No. | Division *1 | Base material *2 | Forming method | Weight (mg/m²) *3 | Organic resin *4 | Silica *6 | soluble chromate *5 | soluble chromate) *7 | soluble chromate *7 | Thickness (μm) | temperature (°C.) |
| 1 | Inv. | 1 | Dried-in-place | 50 | 1 | 1 | 1 | 60/40 | 20/20 | 0.8 | 110 |
| 2 | " | " | " | " | 2 | " | " | " | " | " | " |
| 3 | " | " | " | " | 3 | " | " | " | " | " | " |
| 4 | " | " | " | " | 4 | " | " | " | " | " | " |
| 5 | " | " | " | " | 5 | " | " | " | " | " | " |
| 6 | " | " | " | " | 6 | " | " | " | " | " | " |
| 7 | " | " | " | " | 7 | " | " | " | " | " | " |
| 8 | " | " | " | " | 8 | " | " | " | " | " | " |
| 9 | " | " | " | " | 9 | " | " | " | " | " | " |
| 10 | " | " | " | " | 10 | " | " | " | " | " | " |
| 11 | Com. | " | " | " | 11 | " | " | " | " | " | " |
| 12 | " | " | " | " | 12 | " | " | " | " | " | " |
| 13 | " | " | " | " | 13 | " | " | " | " | " | " |

| | Properties | | | | |
|---|---|---|---|---|---|
| No. | Corrosion resistance (perforation) | Corrosion resistance in a rust-contaminated environment | Adhesion | Anti-powdering property | Weldability |
| 1 | ⊚ | ⊚ | ⊚ | ⊚ | ⊚ |
| 2 | ⊚ | ⊚ | ⊚ | ⊚ | ⊚ |
| 3 | ⊚ | ○ | ⊚ | ⊚ | ⊚ |
| 4 | ⊚ | ○ | ⊚ | ⊚ | ⊚ |
| 5 | ⊚ | ○– | ⊚ | ⊚ | ⊚ |
| 6 | ⊚ | ○– | ⊚ | ⊚ | ⊚ |
| 7 | ⊚ | ○ | ⊚ | ⊚ | ⊚ |
| 8 | ⊚ | ○ | ⊚ | ⊚ | ⊚ |
| 9 | ⊚ | ○ | ⊚ | ⊚ | ⊚ |
| 10 | ⊚ | ○– | ⊚ | ⊚ | ⊚ |
| 11 | X | X | X | ⊚ | ⊚ |
| 12 | Δ | Δ | ⊚ | ⊚ | ⊚ |
| 13 | ⊚ | X | ⊚ | ⊚ | ⊚ |

Note: Corrosion resistance in a rust-contaminated environment is shown by the results of evaluation made after 7 cycles of a corrosion test.

TABLE 14

<Example 2>

| No. | Division *1 | Base material *2 | Chromate film Forming method | Chromate film Weight (mg/m²) *3 | Organic film Organic resin *4 | Organic film Silica *6 | Organic film Sparingly soluble chromate *5 | Organic film Organic resin/ (Silica + Sparingly Sparingly soluble chromate) *7 | Organic film Silica/ Sparingly soluble chromate *7 | Thickness (μm) | Baking temperature (°C.) |
|---|---|---|---|---|---|---|---|---|---|---|---|
| 14 | Inv. | 2 | Dried-in-place | 50 | 1 | 1 | 1 | 60/40 | 20/20 | 0.8 | 110 |
| 15 | " | 3 | " | " | " | " | " | " | " | " | " |
| 16 | " | 4 | " | " | " | " | " | " | " | " | " |
| 17 | " | 5 | " | " | " | " | " | " | " | " | " |
| 18 | " | 6 | " | " | " | " | " | " | " | " | " |
| 19 | " | 7 | " | " | " | " | " | " | " | " | " |
| 20 | " | 8 | " | " | " | " | " | " | " | " | " |
| 21 | " | 9 | " | " | " | " | " | " | " | " | " |
| 22 | " | 10 | " | " | " | " | " | " | " | " | " |
| 23 | " | 1 | Electrolytic | " | " | " | " | " | " | " | " |
| 24 | " | " | Reacted-in-place | " | " | " | " | " | " | " | " |
| 25 | Com. | " | Dried-in-place | 5 | " | " | " | " | " | " | " |
| 26 | Inv. | " | " | 10 | " | " | " | " | " | " | " |

| No. | Corrosion resistance (perforation) | Corrosion resistance in a rust-contaminated environment | Adhesion | Anti-powdering property | Weldability |
|---|---|---|---|---|---|
| 14 | ⊚ | ⊚ | ⊚ | ⊚ | ⊚ |
| 15 | ⊚ | ⊚ | ⊚ | ⊚ | ○ |
| 16 | ⊚ | ⊚ | ⊚ | ⊚ | Δ |
| 17 | ⊚ | ⊚ | ⊚ | ⊚ | ○ |
| 18 | ⊚ | ⊚ | ⊚ | ⊚ | ⊚ |
| 19 | ⊚ | ⊚ | ⊚ | ⊚ | Δ |
| 20 | ⊚ | ⊚ | ⊚ | ⊚ | ⊚ |
| 21 | ⊚ | ⊚ | ⊚ | ⊚ | ⊚ |
| 22 | ⊚ | ⊚ | ⊚ | ⊚ | ⊚ |
| 23 | ○ | ○ | ⊚ | ⊚ | ⊚ |
| 24 | ○ | ○ | ⊚ | ⊚ | ⊚ |
| 25 | ○- | ○- | ⊚ | ⊚ | ⊚ |
| 26 | ○ | ○ | ⊚ | ⊚ | ⊚ |

Note: Corrosion resistance in a rust-contaminated environment is shown by the results of evaluation made after 7 cycles of a corrosion test.

TABLE 15

<Example 2>

| No. | Division *1 | Base material *2 | Chromate film Forming method | Chromate film Weight (mg/m²) *3 | Organic film Organic resin *4 | Organic film Silica *6 | Organic film Sparingly soluble chromate *5 | Organic film Organic resin/ (Silica + Sparingly Sparingly soluble chromate) *7 | Organic film Silica/ Sparingly soluble chromate *7 | Thickness (μm) | Baking temperature (°C.) |
|---|---|---|---|---|---|---|---|---|---|---|---|
| 27 | Inv. | 1 | Dried-in-place | 20 | 1 | 1 | 1 | 60/40 | 20/20 | 0.8 | 110 |
| 28 | " | " | " | 100 | " | " | " | " | " | " | " |
| 29 | " | " | " | 200 | " | " | " | " | " | " | " |
| 30 | Com. | " | " | 300 | " | " | " | " | " | " | " |
| 31 | Inv. | " | " | 50 | " | 2 | " | " | " | " | " |
| 32 | " | " | " | " | " | 3 | " | " | " | " | " |
| 33 | " | " | " | " | " | 4 | " | " | " | " | " |
| 34 | " | " | " | " | " | 5 | " | " | " | " | " |
| 35 | " | " | " | " | " | 6 | " | " | " | " | " |
| 36 | " | " | " | " | " | 7 | " | " | " | " | " |

TABLE 15-continued

| 37 | " | " | " | " | 8 | " | " | " | " | " |
|---|---|---|---|---|---|---|---|---|---|---|
| 38 | " | " | " | " | 9 | " | " | " | " | " |
| 39 | " | " | " | " | 10 | " | " | " | " | " |

| | | Properties | | | |
|---|---|---|---|---|---|
| No. | Corrosion resistance (perforation) | Corrosion resistance in a rust-contaminated environment | Adhesion | Anti-powdering property | Weldability |
| 27 | ⊚ | ⊚ | ⊚ | ⊚ | ⊚ |
| 28 | ⊚ | ⊚ | ⊚ | ⊚ | ⊚ |
| 29 | ⊚ | ⊚ | ⊚ | ⊚ | ⊚ |
| 30 | ⊚ | ⊚ | ⊚ | ⊚ | X |
| 31 | ⊚ | ⊚ | ⊚ | ⊚ | ⊚ |
| 32 | ⊚ | ⊚ | ⊚ | ⊚ | ⊚ |
| 33 | ⊚ | ⊚ | ⊚ | ⊚ | ⊚ |
| 34 | ⊚ | ○ | ⊚ | ⊚ | ⊚ |
| 35 | ⊚ | ○ | ⊚ | ⊚ | ⊚ |
| 36 | ⊚ | ○ | ⊚ | ⊚ | ⊚ |
| 37 | ⊚ | ○ | ⊚ | ⊚ | ⊚ |
| 38 | ⊚ | ○ | ⊚ | ⊚ | ⊚ |
| 39 | ⊚ | ○ | ⊚ | ⊚ | ⊚ |

Note: Corrosion resistance in a rust-contaminated environment is shown by the results of evaluation made after 7 cycles of a corrosion test.

TABLE 16

<Example 2>

| | | Base | Chromate film | | | | | Organic film | | | |
|---|---|---|---|---|---|---|---|---|---|---|---|
| No. | Division *1 | material *2 | Forming method | Weight (mg/m²) *3 | Organic resin *4 | Silica *6 | Sparingly soluble chromate *5 | Organic resin/ (Silica + Sparingly soluble chromate) *7 | Silica/ Sparingly soluble chromate *7 | Thickness (μm) | Baking temperature (°C.) |
| 40 | Inv. | 1 | Dried-in-place | 50 | 1 | 1 | 2 | 60/40 | 20/20 | 0.8 | 110 |
| 41 | " | " | " | " | " | " | 3 | " | " | " | " |
| 42 | " | " | " | " | " | " | 4 | " | " | " | " |
| 43 | " | " | " | " | " | " | 5 | " | " | " | " |
| 44 | " | " | " | " | " | " | 1 | 90/10 | 5/5 | " | " |
| 45 | " | " | " | " | " | " | " | 40/60 | 30/30 | " | " |
| 46 | Com. | " | " | " | " | " | " | 95/5 | 2.5/2.5 | " | " |
| 47 | Inv. | " | " | " | " | " | " | 30/70 | 35/35 | " | " |
| 48 | Com. | " | " | " | " | " | " | 60/40 | 40/0 | " | " |
| 49 | Inv. | " | " | " | " | " | " | " | 35/5 | " | " |
| 50 | " | " | " | " | " | " | " | " | 30/10 | " | " |
| 51 | " | " | " | " | " | " | " | " | 10/30 | " | " |
| 52 | " | " | " | " | " | " | " | " | 5/35 | " | " |
| 53 | " | " | " | " | " | " | " | " | 1/39 | " | " |

| | | Properties | | | |
|---|---|---|---|---|---|
| No. | Corrosion resistance (perforation) | Corrosion resistance in a rust-contaminated environment | Adhesion | Anti-powdering property | Weldability |
| 40 | ⊚ | ⊚ | ⊚ | ⊚ | ⊚ |
| 41 | ⊚ | ⊚ | ⊚ | ⊚ | ⊚ |
| 42 | ⊚ | ⊚ | ⊚ | ⊚ | ⊚ |
| 43 | ⊚ | ⊚ | ⊚ | ⊚ | ⊚ |
| 44 | ⊚ | ○− | ⊚ | ⊚ | ⊚ |
| 45 | ⊚ | ⊚ | ⊚ | ⊚ | ⊚ |
| 46 | Δ | X | ⊚ | ⊚ | ⊚ |
| 47 | ⊚ | ⊚ | X | Δ | ⊚ |
| 48 | ○− | Δ | ⊚ | ⊚ | ⊚ |
| 49 | ⊚ | ○− | ⊚ | ⊚ | ⊚ |
| 50 | ⊚ | ○ | ⊚ | ⊚ | ⊚ |

TABLE 16-continued

| | | | | | |
|---|---|---|---|---|---|
| 51 | ◯ | ◉ | ◉ | ◯ | ◯ |
| 52 | ◉ | ◉ | ◯ | ◯ | ◯ |
| 53 | ◯− | ◯ | ◯ | ◯ | ◯ |

Note: Corrosion resistance in a rust-contaminated environment is shown by the results of evaluation made after 7 cycles of a corrosion test.

TABLE 17

<Example 2>

| No. | Divi- sion *1 | Base mater- ial *2 | Chromate film Forming method | Weight (mg/m²) *3 | Organic resin *4 | Silica *6 | Sparingly soluble chromate *5 | Organic resin/ (Silica + Sparingly soluble chromate) *7 | Silica/ Sparingly soluble chromate *7 | Thick- ness (μm) | Baking temper- ature (°C.) |
|---|---|---|---|---|---|---|---|---|---|---|---|
| 54 | Inv. | 1 | Dried-in-place | 50 | 1 | 1 | 1 | 60/4 | 20/20 | 0.2 | 110 |
| 55 | " | " | " | " | " | " | " | " | " | 0.3 | " |
| 56 | " | " | " | " | " | " | " | " | " | 1.5 | " |
| 57 | " | " | " | " | " | " | " | " | " | 2.0 | " |
| 58 | Com. | " | " | " | " | " | " | " | " | 0.1 | " |
| 59 | " | " | " | " | " | " | " | " | " | 2.5 | " |
| 60 | Inv. | " | " | " | " | " | " | " | " | 0.8 | 80 |
| 61 | " | " | " | " | " | " | " | " | " | " | 100 |
| 62 | " | " | " | " | " | " | " | " | " | " | 200 |
| 63 | " | " | " | " | " | " | " | " | " | " | 250 |
| 64 | Com. | " | " | " | " | " | " | " | " | " | 40 |
| 65 | " | " | " | " | " | " | " | " | " | " | 300 |

| No. | Corrosion resistance (perforation) | Corrosion resistance in a rust-contaminated environment | Adhesion | Anti- powdering property | Weldability |
|---|---|---|---|---|---|
| 54 | ◯ | ◯− | ◉ | ◉ | ◉ |
| 55 | ◉ | ◯ | ◉ | ◉ | ◉ |
| 56 | ◉ | ◉ | ◉ | ◉ | ◉ |
| 57 | ◉ | ◉ | ◉ | ◉ | ◯ |
| 58 | X | X | ◉ | ◉ | ◉ |
| 59 | ◉ | ◉ | ◉ | ◉ | Δ |
| 60 | ◯ | ◯ | ◉ | ◉ | ◉ |
| 61 | ◉ | ◉ | ◉ | ◉ | ◉ |
| 62 | ◉ | ◉ | ◉ | ◉ | ◉ |
| 63 | ◯ | ◯ | ◉ | ◉ | ◉ |
| 64 | X | X | ◉ | X | ◉ |
| 65 | Δ | X | ◉ | ◉ | ◉ |

Note: Corrosion resistance in a rust-contaminated environment is shown by the results of evaluation made after 7 cycles of a corrosion test.

TABLE 18

<Example 2>

| No. | Divi- sion *1 | Base mater- ial *2 | Chromate film Forming method | Weight (mg/m²) *3 | Organic resin *4 | Silica *6 | Sparingly soluble chromate *5 | Organic resin/ (Silica + Sparingly soluble chromate) *7 | Silica/ Sparingly soluble chromate *7 | Thick- ness (μm) | Baking temper- ature (°C.) |
|---|---|---|---|---|---|---|---|---|---|---|---|
| 66 | Inv. | 1 | Dried-in-place | 50 | 14 | 1 | 1 | 60/40 | 20/20 | 0.8 | 110 |
| 67 | " | " | " | " | 15 | " | " | " | " | " | " |
| 68 | " | " | " | " | 16 | " | " | " | " | " | " |

TABLE 18-continued

| 69 | Com. | " | " | " | 17 | " | " | " | " | " | " |
| 70 | Inv. | " | " | " | 1 | " | " | " | " | " | " |
| 71 | " | " | " | " | 2 | " | " | " | " | " | " |
| 72 | " | " | " | " | 8 | " | " | " | " | " | " |

| | Properties | | | | |
|---|---|---|---|---|---|
| No. | Corrosion resistance (perforation) | Corrosion resistance in a rust-contaminated environment | Adhesion | Anti-powdering property | Weldability |
| 66 | ⊚ | ⊚ | ⊚ | ⊚ | ⊚ |
| 67 | ⊚ | ⊚ | ⊚ | ⊚ | ⊚ |
| 68 | ⊚ | ○ | ⊚ | ⊚ | ⊚ |
| 69 | Δ | Δ | ⊚ | ⊚ | ⊚ |
| 70 | ⊚ | ○ | ⊚ | ⊚ | ⊚ |
| 71 | ⊚ | ○ | ⊚ | ⊚ | ⊚ |
| 72 | ⊚ | ○ | ⊚ | ⊚ | ⊚ |

Notes:
(1) Corrosion resistance in a rust-contaminated environment is shown by the results of evaluation made after 15 cycles of a corrosion test.
(2) Although Nos. 70, 71 and 72 are of the same coating composition with Nos. 1, 2 and 8, respectively, 15 cycles of a corrosion resistance test in a rust-contaminated environment were given to Nos. 70 to 71 and 72, while Nos. 1, 2 and 8 were given 7 cycles of the same test.

TABLE 19

<Example 2>

| No. | Division *1 | Base material *2 | Chromate film Forming method | Chromate film Weight (mg/m²) *3 | Organic film Organic resin *4 | Organic film Silica *6 | Organic film Sparingly soluble chromate *5 | Organic film Organic resin/ (Silica + Sparingly soluble chromate) *7 | Organic film Silica/ Sparingly soluble chromate *7 | Thickness (μm) | Baking temperature (°C.) |
|---|---|---|---|---|---|---|---|---|---|---|---|
| 73 | Inv. | 2 | Dried-in-place | 50 | 14 | 1 | 1 | 60/40 | 20/20 | 0.8 | 110 |
| 74 | " | 3 | " | " | " | " | " | " | " | " | " |
| 75 | " | 4 | " | " | " | " | " | " | " | " | " |
| 76 | " | 5 | " | " | " | " | " | " | " | " | " |
| 77 | " | 6 | " | " | " | " | " | " | " | " | " |
| 78 | " | 7 | " | " | " | " | " | " | " | " | " |
| 79 | " | 8 | " | " | " | " | " | " | " | " | " |
| 80 | " | 9 | " | " | " | " | " | " | " | " | " |
| 81 | " | 10 | " | " | " | " | " | " | " | " | " |
| 82 | " | 1 | Electrolytic | " | " | " | " | " | " | " | " |
| 83 | " | " | Reacted-in-place | " | " | " | " | " | " | " | " |
| 84 | Com. | " | Dried-in-place | 5 | " | " | " | " | " | " | " |
| 85 | Inv. | " | " | 10 | " | " | " | " | " | " | " |

| | Properties | | | | |
|---|---|---|---|---|---|
| No. | Corrosion resistance (perforation) | Corrosion resistance in a rust-contaminated environment | Adhesion | Anti-powdering property | Weldability |
| 73 | ⊚ | ⊚ | ⊚ | ⊚ | ⊚ |
| 74 | ⊚ | ⊚ | ⊚ | ⊚ | ○ |
| 75 | ⊚ | ⊚ | ⊚ | ⊚ | Δ |
| 76 | ⊚ | ⊚ | ⊚ | ⊚ | ○ |
| 77 | ⊚ | ⊚ | ⊚ | ⊚ | ⊚ |
| 78 | ⊚ | ○ | ⊚ | ⊚ | Δ |
| 79 | ⊚ | ⊚ | ⊚ | ⊚ | ⊚ |
| 80 | ⊚ | ⊚ | ⊚ | ⊚ | ⊚ |
| 81 | ⊚ | ⊚ | ⊚ | ⊚ | ⊚ |
| 82 | ○ | ○ | ⊚ | ⊚ | ○ |

TABLE 19-continued

| | | | | | |
|---|---|---|---|---|---|
| 83 | ○ | ○ | ⊙ | ⊙ | ⊙ |
| 84 | ○− | ○− | ⊙ | ⊙ | ⊙ |
| 85 | ○ | ○ | ⊙ | ⊙ | ⊙ |

Note: Corrosion resistance in a rust-contaminated environment is shown by the results of evaluation made after 15 cycles of a corrosion test.

TABLE 20

<Example 2>

| No. | Division *1 | Base material *2 | Chromate film Forming method | Weight (mg/m²) *3 | Organic resin *4 | Silica *6 | Sparingly soluble chromate *5 | Organic resin/ (Silica + Sparingly soluble chromate) *7 | Silica/ Sparingly soluble chromate *7 | Thickness (μm) | Baking temperature (°C.) |
|---|---|---|---|---|---|---|---|---|---|---|---|
| 86 | Inv. | 1 | Dried-in-place | 20 | 14 | 1 | 1 | 60/40 | 20/20 | 0.8 | 110 |
| 87 | " | " | " | 100 | " | " | " | " | " | " | " |
| 88 | " | " | " | 200 | " | " | " | " | " | " | " |
| 89 | Com. | " | " | 300 | " | " | " | " | " | " | " |
| 90 | Inv. | " | " | 50 | " | 2 | " | " | " | " | " |
| 91 | " | " | " | " | " | 3 | " | " | " | " | " |
| 92 | " | " | " | " | " | 4 | " | " | " | " | " |
| 93 | " | " | " | " | " | 5 | " | " | " | " | " |
| 94 | " | " | " | " | " | 6 | " | " | " | " | " |
| 95 | " | " | " | " | " | 7 | " | " | " | " | " |
| 96 | " | " | " | " | " | 8 | " | " | " | " | " |
| 97 | " | " | " | " | " | 9 | " | " | " | " | " |
| 98 | " | " | " | " | " | 10 | " | " | " | " | " |

| | Properties | | | | |
|---|---|---|---|---|---|
| No. | Corrosion resistance (perforation) | Corrosion resistance in a rust-contaminated environment | Adhesion | Anti-powdering property | Weldability |
| 86 | ⊙ | ⊙ | ⊙ | ⊙ | ⊙ |
| 87 | ⊙ | ⊙ | ⊙ | ⊙ | ⊙ |
| 88 | ⊙ | ⊙ | ⊙ | ⊙ | ⊙ |
| 89 | ⊙ | ⊙ | ⊙ | ⊙ | X |
| 90 | ⊙ | ⊙ | ⊙ | ⊙ | ⊙ |
| 91 | ⊙ | ⊙ | ⊙ | ⊙ | ⊙ |
| 92 | ⊙ | ⊙ | ⊙ | ⊙ | ⊙ |
| 93 | ⊙ | ○ | ⊙ | ⊙ | ⊙ |
| 94 | ⊙ | ○ | ⊙ | ⊙ | ⊙ |
| 95 | ⊙ | ○ | ⊙ | ⊙ | ⊙ |
| 96 | ⊙ | ○ | ⊙ | ⊙ | ⊙ |
| 97 | ⊙ | ○ | ⊙ | ⊙ | ⊙ |
| 98 | ○ | ○ | ⊙ | ⊙ | ⊙ |

Note: Corrosion resistance in a rust-contaminated environment is shown by the results of evaluation made after 15 cycles of a corrosion test.

TABLE 21

<Example 2>

| No. | Division *1 | Base material *2 | Chromate film Forming method | Weight (mg/m²) *3 | Organic resin *4 | Silica *6 | Sparingly soluble chromate *5 | Organic resin/ (Silica + Sparingly soluble chromate) *7 | Silica/ Sparingly soluble chromate *7 | Thickness (μm) | Baking temperature (°C.) |
|---|---|---|---|---|---|---|---|---|---|---|---|
| 99 | Inv. | 1 | Dried-in-place | 50 | 14 | 1 | 2 | 60/40 | 20/20 | 0.8 | 110 |
| 100 | " | " | " | " | " | " | 3 | " | " | " | " |
| 101 | " | " | " | " | " | " | 4 | " | " | " | " |

TABLE 21-continued

| No. | | | | | | | | | | | |
|-----|---|---|---|---|---|---|---|---|---|---|---|
| 102 | " | " | " | " | " | " | 5 | " | " | " | " |
| 103 | " | " | " | " | " | " | 1 | 90/10 | 5/5 | " | " |
| 104 | " | " | " | " | " | " | " | 40/60 | 30/30 | " | " |
| 105 | Com. | " | " | " | " | " | " | 95/5 | 2.5/2.5 | " | " |
| 106 | Inv. | " | " | " | " | " | " | 30/70 | 35/35 | " | " |
| 107 | Com. | " | " | " | " | " | " | 60/40 | 40/0 | " | " |
| 108 | Inv. | " | " | " | " | " | " | " | 35/5 | " | " |
| 109 | " | " | " | " | " | " | " | " | 30/10 | " | " |
| 110 | " | " | " | " | " | " | " | " | 10/30 | " | " |
| 111 | " | " | " | " | " | " | " | " | 5/35 | " | " |
| 112 | " | " | " | " | " | " | " | " | 1/39 | " | " |

Properties

| No. | Corrosion resistance (perforation) | Corrosion resistance in a rust-contaminated environment | Adhesion | Anti-powdering property | Weldability |
|-----|---|---|---|---|---|
| 99  | ◎ | ◎ | ◎ | ◎ | ◎ |
| 100 | ◎ | ◎ | ◎ | ◎ | ◎ |
| 101 | ◎ | ◎ | ◎ | ◎ | ◎ |
| 102 | ◎ | ◎ | ◎ | ◎ | ◎ |
| 103 | ○ | ○– | ◎ | ◎ | ◎ |
| 104 | ◎ | ◎ | ◎ | ◎ | ◎ |
| 105 | △ | X | ◎ | ◎ | ◎ |
| 106 | ◎ | ◎ | X | △ | ◎ |
| 107 | ○– | △ | ◎ | ◎ | ◎ |
| 108 | ◎ | ○– | ◎ | ◎ | ◎ |
| 109 | ◎ | ○ | ◎ | ◎ | ◎ |
| 110 | ◎ | ◎ | ◎ | ◎ | ◎ |
| 111 | ◎ | ◎ | ◎ | ◎ | ◎ |
| 112 | ○– | ◎ | ◎ | ◎ | ◎ |

Note: Corrosion resistance in a rust-contaminated environment is shown by the results of evaluation made after 15 cycles of a corrosion test.

TABLE 22

<Example 2>

| No. | Division *1 | Base material *2 | Chromate film Forming method | Chromate film Weight (mg/m²) *3 | Organic resin *4 | Silica *6 | Sparingly soluble chromate *5 | Organic resin/(Silica + Sparingly soluble chromate) *7 | Silica/Sparingly soluble chromate *7 | Thickness (μm) | Baking temperature (°C) |
|-----|------|---|---|----|----|---|---|------|-------|-----|-----|
| 113 | Inv. | 1 | Dried-in-place | 50 | 14 | 1 | 1 | 60/4 | 20/20 | 0.2 | 110 |
| 114 | "    | " | " | " | " | " | " | " | " | 0.3 | " |
| 115 | "    | " | " | " | " | " | " | " | " | 1.5 | " |
| 116 | "    | " | " | " | " | " | " | " | " | 2.0 | " |
| 117 | Com. | " | " | " | " | " | " | " | " | 0.1 | " |
| 118 | "    | " | " | " | " | " | " | " | " | 2.5 | " |
| 119 | Inv. | " | " | " | " | " | " | " | " | 0.8 | 80 |
| 120 | "    | " | " | " | " | " | " | " | " | " | 100 |
| 121 | "    | " | " | " | " | " | " | " | " | " | 200 |
| 122 | "    | " | " | " | " | " | " | " | " | " | 250 |
| 123 | Com. | " | " | " | " | " | " | " | " | " | 40 |
| 124 | "    | " | " | " | " | " | " | " | " | " | 300 |

Properties

| No. | Corrosion resistance (perforation) | Corrosion resistance in a rust-contaminated environment | Adhesion | Anti-powdering property | Weldability |
|-----|---|---|---|---|---|
| 113 | ○ | ○– | ◎ | ◎ | ◎ |
| 114 | ◎ | ○ | ◎ | ◎ | ◎ |
| 115 | ◎ | ◎ | ◎ | ◎ | ◎ |
| 116 | ◎ | ◎ | ◎ | ◎ | ○ |
| 117 | X | X | ◎ | ◎ | ◎ |
| 118 | ◎ | ◎ | ◎ | ◎ | △ |

TABLE 22-continued

| | | | | | |
|---|---|---|---|---|---|
| 119 | ○ | ○ | ○ | ○ | ○ |
| 120 | ○ | ○ | ○ | ○ | ○ |
| 121 | ○ | ○ | ○ | ○ | ○ |
| 122 | ○ | ○ | ○ | ○ | ○ |
| 123 | X | X | ○ | X | ○ |
| 124 | Δ | X | ○ | ○ | ○ |

Note: Corrosion resistance in a rust-contaminated environment is shown by the results of evaluation made after 15 cycles of a corrosion test.

We claim:

1. An organic composite coated steel sheet having an excellent corrosion resistance in a rust-contaminated environment which comprises a zinc or zinc alloy plated steel sheet having a surface coated with a chromate film having a coating weight of 10 to 200 mg/m² in terms of metallic chromium, and an organic resin film formed on said chromate film, having a thickness of 0.2 to 2.0 microns, and comprising:

(i) a base resin obtained by adding at least one basic nitrogen atom and at least two primary hydroxyl groups to the ends of molecules of an epoxy resin;

(ii) a polyfunctional polyisocyanate compound containing at least six isocyanate groups in each molecule; and (iii) a rust-preventing additive at the weight ratio set forth below as a solid content relative to said base resin and said polyfunctional polyisocyanate compound:

(the base resin+the polyfunctional polyisocyanate compound)/the rust-preventing additive=90/10 to 40/60.

2. A coated steel sheet as set forth in claim 1, wherein said rust-preventing additive comprises a sparingly soluble chromate.

3. A coated steel sheet as set forth in claim 2, wherein said sparingly soluble chromate is at least one sparingly soluble chromate selected from the group consisting of barium chromate, strontium chromate, calcium chromate, zinc chromate, potassium zinc chromate and lead chromate.

4. A coated steel sheet as set forth in claim 1, wherein said rust-preventing additive comprises silica and a sparingly soluble chromate and has a silica/chromate ratio of 35/5 to 1/39 by weight of solid content.

5. A coated steel sheet as set forth in claim 4, wherein said sparingly soluble chromate is at least one sparingly soluble chromate selected from the group consisting of barium chromate, strontium chromate, calcium chromate, zinc chromate, potassium zinc chromate and lead chromate.

6. A coated steel sheet as set forth in claim 1, wherein said rust-preventing additive comprises a sparingly soluble chromate, and said organic resin film comprises 5 to 80 parts by weight of said polyisocyanate compound for 100 parts by weight of said base resin in solid form.

7. A coated steel sheet as set forth in claim 1, wherein said rust-preventing additive comprises silica and a sparingly soluble chromate and has a silica/chromate ratio of 35/5 to 1/39 by weight of solid content, and said organic resin film comprises 5 to 80 parts by weight of said polyisocyanate compound for 100 parts by weight of said base resin in solid form.

8. An organic composite coated steel sheet having an excellent corrosion resistance in a rust-contaminated environment which comprises a zinc or zinc alloy plated steel sheet having a surface coated with a chromate film having a coating weight of 10 to 200 mg/m² in terms of metallic chromium, and an organic resin film formed on said chromate film, having a thickness of 0.2 to 2.0 microns, and comprising:

(i) a base resin obtained by adding at least one basic nitrogen atom and at least two primary hydroxyl groups to the ends of molecules of an epoxy resin;

(ii) a polyfunctional polyisocyanate compound containing at least six isocyanate groups in each molecule; and (iii) a sparingly soluble chromate and a hydrophobic silica at the weight ratio set forth below as a solid content relative to said base resin and said polyfunctional polyisocyanate compound:

(the base resin + the polyfunctional polyisocyanate compound)/(the sparingly soluble chromate + the hydrophobic silica) = 90/10 to 40/60;

the hydrophobic silica/the sparingly soluble chromate = 35/5 to 1/39.

9. A coated steel sheet as set forth in claim 8, wherein said organic resin film comprises 5 to 80 parts by weight of said polyisocyanate compound for 100 parts by weight of said base resin in solid form.

10. An organic composite coated steel sheet having an excellent corrosion resistance in a rust-contaminated environment which comprises a zinc or zinc alloy plated steel sheet having a surface coated with a chromate film having a coating weight of 10 to 200 mg/m² in terms of metallic chromium, and an organic resin film formed on said chromate film, having a thickness of 0.2 to 2.0 microns, and comprising:

(i) a base resin obtained by adding at least one basic nitrogen atom and at least two primary hydroxyl groups to the ends of molecules of an epoxy resin;

(ii) 10 to 50 parts by weight of a polyfunctional polyisocyanate compound containing at least six isocyanate groups in each molecule for 100 parts by weight of said base resin in solid form; and (iii) a sparingly soluble chromate at the weight ratio set forth below as a solid content relative to said base resin and said polyfunctional polyisocyanate compound:

(the base resin+the polyfunctional polyisocyanate compound)/the sparingly soluble chromate=70/30 to 40/60.

11. An organic composite coated steel sheet having an excellent corrosion resistance in a rust-contaminated environment which comprises a zinc or zinc alloy plated steel sheet having a surface coated with a chromate film having a coating weight of 10 to 200 mg/m² in terms of metallic chromium, and an organic resin film formed on said chromate film, having a thickness of 0.2 to 2.0 microns, and comprising:

(i) a base resin obtained by adding at least one basic nitrogen atom and at least two primary hydroxyl groups to the ends of molecules of an epoxy resin;

(ii) 10 to 50 parts by weight of a polyfunctional polyisocyanate compound containing at least six isocyanate groups in each molecule for 100 parts by weight of said base resin in solid form; and (iii) a sparingly soluble chromate and a silica at the weight ratio set forth below as a solid content relative to said base resin and said polyfunctional polyisocyanate compound:

(the base resin + the polyfunctional polyisocyanate compound)/(the sparingly soluble chromate + the silica) = 70/30 to 40/60;

the silica/the sparingly soluble chromate = 20/20 to 1/39.

12. A coated steel sheet as set forth in claim 11, wherein said silica is hydrophobic.

13. A coated steel sheet as set forth in any of claims 1 to 12, wherein said polyisocyanate compound is a polyfunctional hexamethylene diisocyanate containing at least six isocyanate groups in each molecule.

* * * * *